(12) United States Patent
Reeves et al.

(10) Patent No.: US 12,321,824 B1
(45) Date of Patent: Jun. 3, 2025

(54) PIPELINED MACHINE LEARNING FRAMEWORKS

(71) Applicant: Liberty Mutual Insurance Company, Boston, MA (US)

(72) Inventors: Matthew Reeves, Boston, MA (US); Ben Thompson, Bellevue, WA (US)

(73) Assignee: Liberty Mutual Insurance Company, Boston, MA (US)

( * ) Notice: Subject to any disclaimer, the term of this patent is extended or adjusted under 35 U.S.C. 154(b) by 1087 days.

(21) Appl. No.: 17/143,769

(22) Filed: Jan. 7, 2021

Related U.S. Application Data

(60) Provisional application No. 62/958,379, filed on Jan. 8, 2020.

(51) Int. Cl.
*G06F 18/214* (2023.01)
*G06N 5/04* (2023.01)
*G06N 20/00* (2019.01)

(52) U.S. Cl.
CPC .......... *G06N 20/00* (2019.01); *G06F 18/214* (2023.01); *G06N 5/04* (2013.01)

(58) Field of Classification Search
CPC .................................................. G06N 20/00
USPC .......................................................... 706/12
See application file for complete search history.

(56) References Cited

U.S. PATENT DOCUMENTS

| | | | | |
|---|---|---|---|---|
| 4,831,526 A | * | 5/1989 | Luchs | G06Q 40/02 705/4 |
| 6,117,076 A | * | 9/2000 | Cassidy | A61B 5/0006 600/300 |
| 10,713,577 B1 | * | 7/2020 | Faruquie | G06N 5/022 |
| 11,042,909 B2 | * | 6/2021 | Vij | G06F 40/30 |
| 11,062,378 B1 | * | 7/2021 | Ross | G06Q 30/01 |
| 2016/0048766 A1 | * | 2/2016 | McMahon | G06Q 40/08 706/12 |
| 2016/0063636 A1 | * | 3/2016 | Feimster | G06Q 40/08 705/4 |
| 2017/0330099 A1 | * | 11/2017 | de Vial | G06Q 40/04 |
| 2018/0356807 A1 | * | 12/2018 | Honda | G05B 19/41885 |
| 2019/0087887 A1 | * | 3/2019 | Westphal | G06F 3/0482 |
| 2019/0164084 A1 | * | 5/2019 | Gulin | G06F 16/9027 |
| 2020/0005045 A1 | * | 1/2020 | Lloyd, II | G06V 10/96 |
| 2020/0020098 A1 | * | 1/2020 | Odry | G06T 7/0012 |

(Continued)

OTHER PUBLICATIONS

Unfold Data Science, "Gradient Boost Machine Learning |How Gradient boost work in Machine Learning", available online at [https://www.youtube.com/watch?v=j034-r302Cg], posted on Feb. 18, 2020. (Year: 2020).*

(Continued)

*Primary Examiner* — Reza Nabi

(74) *Attorney, Agent, or Firm* — Alston & Bird LLP

(57) ABSTRACT

In general, embodiments of the present invention provide methods, apparatus, systems, computing devices, computing entities, and/or the like for pipelined machine learning. Certain embodiments of the present invention utilize systems, methods, and computer program products that perform pipelined machine learning using at least one of error correction machine learning models and output augmentation machine learning models, for example using a pipelined implementation of error correction machine learning models followed by output augmentation machine learning models.

20 Claims, 12 Drawing Sheets

(56) References Cited

U.S. PATENT DOCUMENTS

| | | | | |
|---|---|---|---|---|
| 2020/0034732 | A1* | 1/2020 | Freed | G06N 5/02 |
| 2020/0074997 | A1* | 3/2020 | Jankowski, Jr. | G06N 3/045 |
| 2020/0090056 | A1* | 3/2020 | Singhal | G06N 3/045 |
| 2020/0117523 | A1* | 4/2020 | Morrison | G06F 9/547 |
| 2020/0226503 | A1* | 7/2020 | Subramanian | G06Q 10/04 |
| 2020/0279219 | A1* | 9/2020 | Desai | G06F 16/355 |
| 2020/0372561 | A1* | 11/2020 | Sanghavi | G06N 5/046 |
| 2021/0065048 | A1* | 3/2021 | Salonidis | G06N 20/00 |
| 2021/0117855 | A1* | 4/2021 | Hoover | G06N 20/00 |
| 2021/0374566 | A1* | 12/2021 | Goyal | G06N 5/022 |
| 2022/0150275 | A1* | 5/2022 | McNee | H04L 63/1441 |
| 2022/0198156 | A1* | 6/2022 | Rao | G06F 11/0709 |
| 2023/0060099 | A1* | 2/2023 | Babich | G06F 18/2433 |
| 2023/0418654 | A1* | 12/2023 | Zuccarelli | G06N 5/01 |

OTHER PUBLICATIONS

Ronald Joseph, "Grid search for model tuning", available online at <https://towardsdatascience.com/grid-search-for-model-tuning-3319b259367e>, published on Dec. 29, 2018 (Year: 2018).*

"Chapter 9—Temporal-Difference Learning," Stanford University, (18 pages). [Online]. [Retrieved from the Internet Feb. 17, 2021] <URL: https://web.stanford.edu/group/pdplab/pdphandbook/handbookch10.html>.

"Minimizing Real-Time Prediction Serving Latency In Machine Learning," Google Cloud, Nov. 16, 2020, (21 pages). [Article, Online]. [Retrieved from the Internet Feb. 17, 2021] <URL: https://cloud.google.com/solutions/machine-learning/minimizing-predictive-serving-latency-in-machine-learning>.

Dugas, Charles et al. "Statistical Learning Algorithms Applied To Automobile Insurance Ratemaking," In The Casualty Actuarial Society Forum, Mar. 27, 2003, vol. 1, No. 1, pp. 179-214.

Karaman, Baris. "Market Response Models—Predicting Incremental Gains Of Promotional Campaigns," Towards Data Science, Jul. 28, 2019, (17 pages). [Article, Online]. [Retrieved from the Internet Feb. 17, 2021] <URL: https://towardsdatascience.com/market-response-models-baf9f9913298>.

Kim, Jin Kyu et al. "Smpframe: A Distributed Framework For Scheduled Model Parallel Machine Learning," Parallel Data Laboratory, Carnegie Mellon University, May 2015, (26 pages).

Koen, Semi. "Architecting A Machine Learning Pipeline," Towards Data Science, Apr. 5, 2019, (22 pages). [Article, Online]. [Retrieved from the Internet Feb. 17, 2021] <URL: https://towardsdatascience.com/architecting-a-machine-learning-pipeline-a847f094d1c7>.

Krishnan, Sanjay et al. "BoostClean: Automated Error Detection and Repair for Machine Learning," arXiv:1711.01299v1, Nov. 3, 2017, (15 pages).

Sato, Danilo et al. "Continuous Delivery For Machine Learning," Martin Fowler, Sep. 19, 2019, (34 pages). [Article, Online]. [Retrieved from the Internet Feb. 17, 2021] <URL: https://martinfowler.com/articles/cd4ml.html>.

Soares, Carlos et al. "Machine Learning and Statistics To Detect Errors In Forms: Competition or Cooperation?", In Proceedings of the European Conference on Machine Learning and Principles and Practice of Knowledge Discovery in Databases (ECML/PKDD), Aug. 19, 2002, vol. 2, (7 pages).

Spedicato, Giorgio Alfredo et al. "Machine Learning Methods To Perform Pricing Optimization. A Comparison With Standard Generalized Linear Models," Variance, vol. 12, Issue 1, Dec. 2018, pp. 69-89.

Sporleder, Caroline et al. "Spotting The 'Odd-One-Out': Data-Driven Error Detection and Correction In Textual Databases," 11th Conference of the European Chapter of the Association of Computational Linguistics, In Proceedings of The Workshop on Adaptive Text Extraction and Mining (ATEM 2006), Apr. 4, 2006, pp. 40-47, Trento, Italy.

(Nithila Jeyakumar, "Analysis of the Digital Direct-to-Customer channel in Insurance," MIT (2016) [Thesis]) (Year: 2016).

Non-Final Rejection Mailed on Jun. 5, 2024 for U.S. Appl. No. 17/143,773, 37 page(s).

Robert E. Schapire, "The Boosting Approach to Machine Learning: An Overview," (2001) (Year: 2001).

Non-Final Rejection Mailed on May 3, 2024 for U.S. Appl. No. 17/143,761, 80 page(s).

Final Rejection Mailed on Aug. 29, 2024 for U.S. Appl. No. 17/143,761, 41 page(s).

Advisory Action Mailed on Nov. 8, 2024 for U.S. Appl. No. 17/143,761, 3 page(s).

Final Rejection Mailed on Dec. 13, 2024 for U.S. Appl. No. 17/143,773, 33 page(s).

Lin et al., "A Recommender for Targeted Advertisement of Unsought Products in E-Commerce," IEEE (2005) (Year: 2005).

* cited by examiner

PIPELINED MACHINE LEARNING FRAMEWORKS

CROSS-REFERENCES TO RELATED APPLICATION(S)

The present application claims priority to U.S. Provisional Patent Application No. 62/958,379 (filed on Jan. 8, 2020), which is incorporated by reference herein in its entirety.

BACKGROUND

Various embodiments of the present invention address technical challenges related to performing pipelined machine learning and address the efficiency and reliability shortcomings of existing machine learning solutions.

BRIEF SUMMARY

In general, embodiments of the present invention provide methods, apparatus, systems, computing devices, computing entities, and/or the like for pipelined machine learning. Certain embodiments of the present invention utilize systems, methods, and computer program products that perform pipelined machine learning using at least one of error correction machine learning models and output augmentation machine learning models, for example using a pipelined implementation of error correction machine learning models followed by output augmentation machine learning models.

In accordance with one aspect, a method is provided. In one embodiment, the method comprises: generating one or more inference error correction engineered features based at least in part on an input data object, wherein the one or more inference error correction engineered features include an agent-based error likelihood value describing an estimated error likelihood of an input provider agent associated with the input data object; processing the one or more inference error correction engineered features using a trained error correction machine learning model to generate an error-corrected input data object; and generating a predictive output based at least in part on the error-corrected input data object, wherein the predictive output is configured to be displayed using a predictive output user interface.

In accordance with another aspect, a computer program product is provided. The computer program product may comprise at least one computer-readable storage medium having computer-readable program code portions stored therein, the computer-readable program code portions comprising executable portions configured to: generate one or more inference error correction engineered features based at least in part on an input data object, wherein the one or more inference error correction engineered features include an agent-based error likelihood value describing an estimated error likelihood of an input provider agent associated with the input data object; process the one or more inference error correction engineered features using a trained error correction machine learning model to generate an error-corrected input data object; and generate a predictive output based at least in part on the error-corrected input data object, wherein the predictive output is configured to be displayed using a predictive output user interface.

In accordance with yet another aspect, an apparatus comprising at least one processor and at least one memory including computer program code is provided. In one embodiment, the at least one memory and the computer program code may be configured to, with the processor, cause the apparatus to: generate one or more inference error correction engineered features based at least in part on an input data object, wherein the one or more inference error correction engineered features include an agent-based error likelihood value describing an estimated error likelihood of an input provider agent associated with the input data object; process the one or more inference error correction engineered features using a trained error correction machine learning model to generate an error-corrected input data object; and generate a predictive output based at least in part on the error-corrected input data object, wherein the predictive output is configured to be displayed using a predictive output user interface.

In accordance with a further aspect, a method is provided. In one embodiment, the method comprises: generating one or more inference output augmentation engineered features based at least in part on an input data object, wherein the one or more inference output augmentation engineered features include an agent-based selection likelihood value describing an estimated likelihood of achievement of a desired outcome if a secondary predictive output is provided along with a primary predictive output as part of the predictive output data object; processing the one or more output augmentation correction engineered features using a trained output augmentation machine learning model to generate an augmented input data object; and generating a predictive output based at least in part on the augmented input data object, wherein the predictive output is configured to be displayed using a predictive output user interface.

In accordance with another aspect, a computer program product is provided. The computer program product may comprise at least one computer-readable storage medium having computer-readable program code portions stored therein, the computer-readable program code portions comprising executable portions configured to: generate one or more inference output augmentation engineered features based at least in part on an input data object, wherein the one or more inference output augmentation engineered features include an agent-based selection likelihood value describing an estimated likelihood of achievement of a desired outcome if a secondary predictive output is provided along with a primary predictive output as part of the predictive output data object; process the one or more output augmentation correction engineered features using a trained output augmentation machine learning model to generate an augmented input data object; and generate a predictive output based at least in part on the augmented input data object, wherein the predictive output is configured to be displayed using a predictive output user interface.

In accordance with yet another aspect, an apparatus comprising at least one processor and at least one memory including computer program code is provided. In one embodiment, the at least one memory and the computer program code may be configured to, with the processor, cause the apparatus to: generate one or more inference output augmentation engineered features based at least in part on an input data object, wherein the one or more inference output augmentation engineered features include an agent-based selection likelihood value describing an estimated likelihood of achievement of a desired outcome if a secondary predictive output is provided along with a primary predictive output as part of the predictive output data object; process the one or more output augmentation correction engineered features using a trained output augmentation machine learning model to generate an augmented input data object; and generate a predictive output based at least in part on the augmented input data object, wherein the predictive output is configured to be displayed using a predictive output user interface.

In accordance with a further aspect, a method is provided. In one embodiment, the method comprises: processing the input data object using a plurality of pipelined machine learning models to generate an augmented input data object, wherein: (i) the plurality of pipelined machine learning models comprise an error correction machine learning model that is configured to process the input data object to generate an error-corrected input data object and an output augmentation machine learning model that is configured to process a fine-tuned input data object to generate the augmented input data object, and (ii) the fine-tuned input data object is determined based at least in part on the error-corrected input data object; and generating the predictive output data object based at least in part on the augmented data object, wherein the predictive output is configured to be displayed using a predictive output user interface.

In accordance with another aspect, a computer program product is provided. The computer program product may comprise at least one computer-readable storage medium having computer-readable program code portions stored therein, the computer-readable program code portions comprising executable portions configured to: process the input data object using a plurality of pipelined machine learning models to generate an augmented input data object, wherein: (i) the plurality of pipelined machine learning models comprise an error correction machine learning model that is configured to process the input data object to generate an error-corrected input data object and an output augmentation machine learning model that is configured to process a fine-tuned input data object to generate the augmented input data object, and (ii) the fine-tuned input data object is determined based at least in part on the error-corrected input data object; and generate the predictive output data object based at least in part on the augmented data object, wherein the predictive output is configured to be displayed using a predictive output user interface.

In accordance with yet another aspect, an apparatus comprising at least one processor and at least one memory including computer program code is provided. In one embodiment, the at least one memory and the computer program code may be configured to, with the processor, cause the apparatus to: process the input data object using a plurality of pipelined machine learning models to generate an augmented input data object, wherein: (i) the plurality of pipelined machine learning models comprise an error correction machine learning model that is configured to process the input data object to generate an error-corrected input data object and an output augmentation machine learning model that is configured to process a fine-tuned input data object to generate the augmented input data object, and (ii) the fine-tuned input data object is determined based at least in part on the error-corrected input data object; and generate the predictive output data object based at least in part on the augmented data object, wherein the predictive output is configured to be displayed using a predictive output user interface.

BRIEF DESCRIPTION OF THE DRAWINGS

Figure 1:
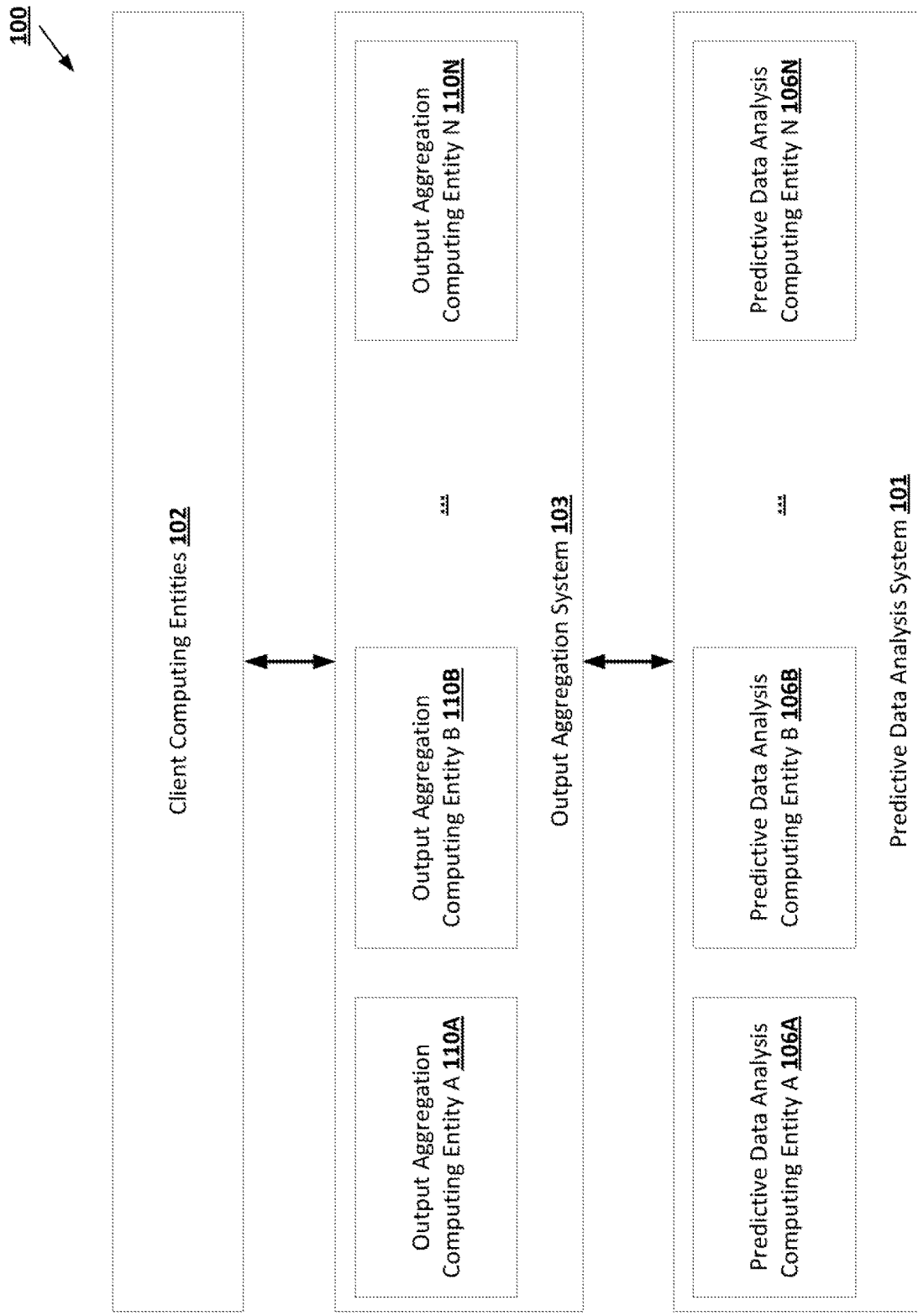

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
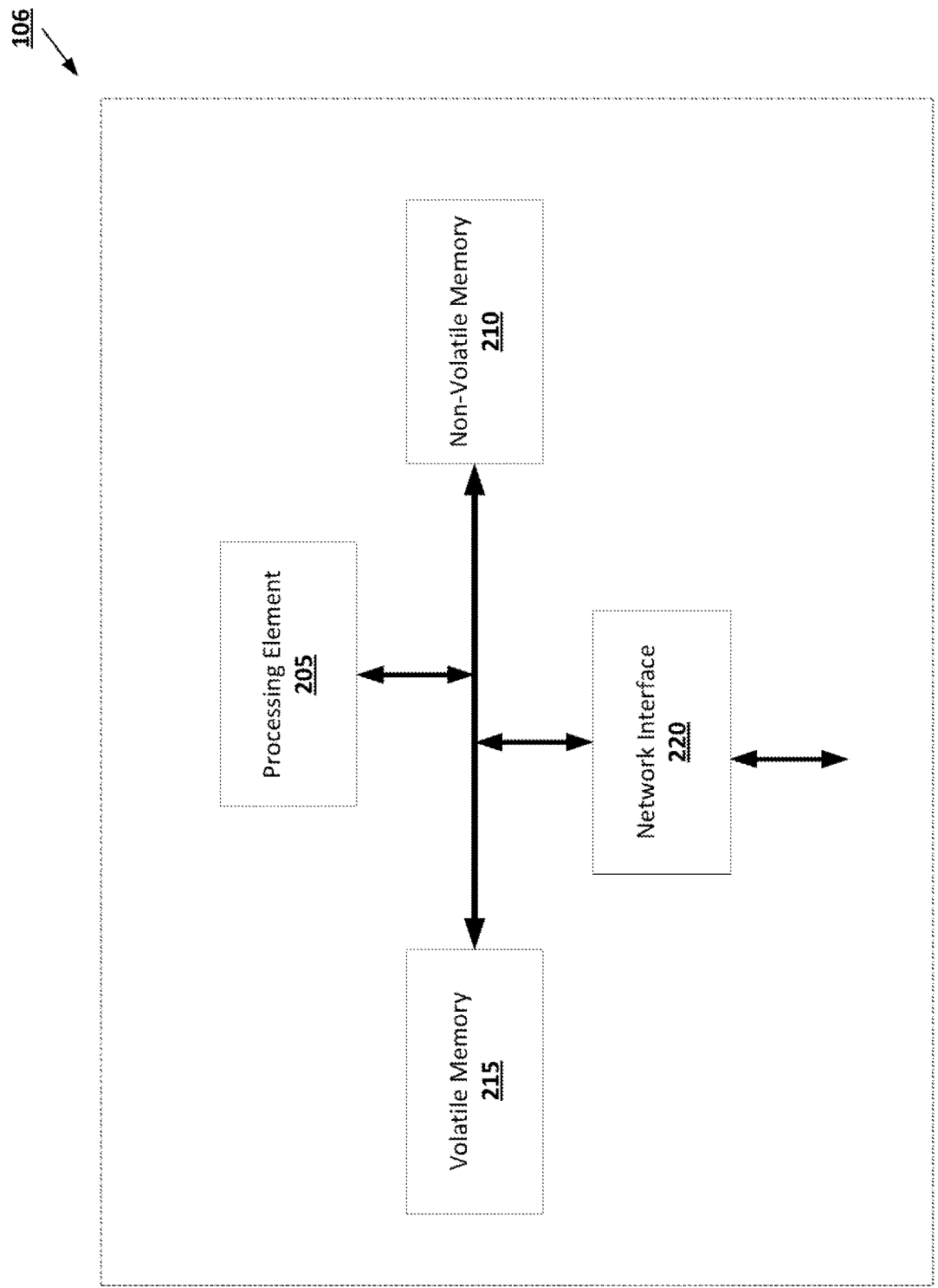

FIG. 2 provides an example predictive data analysis computing entity in accordance with some embodiments discussed herein.

Figure 3:
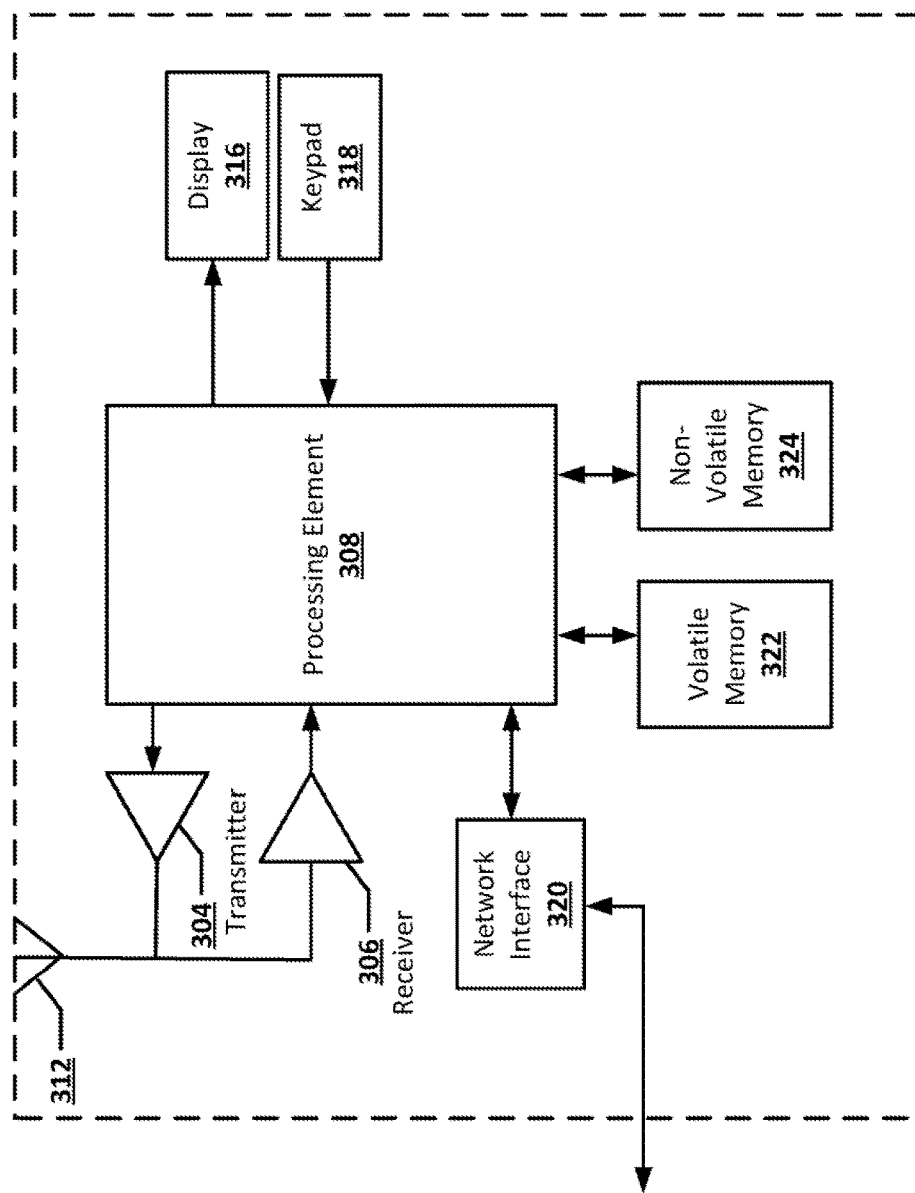

FIG. 3 provides an example client computing entity in accordance with some embodiments discussed herein.

Figure 4:
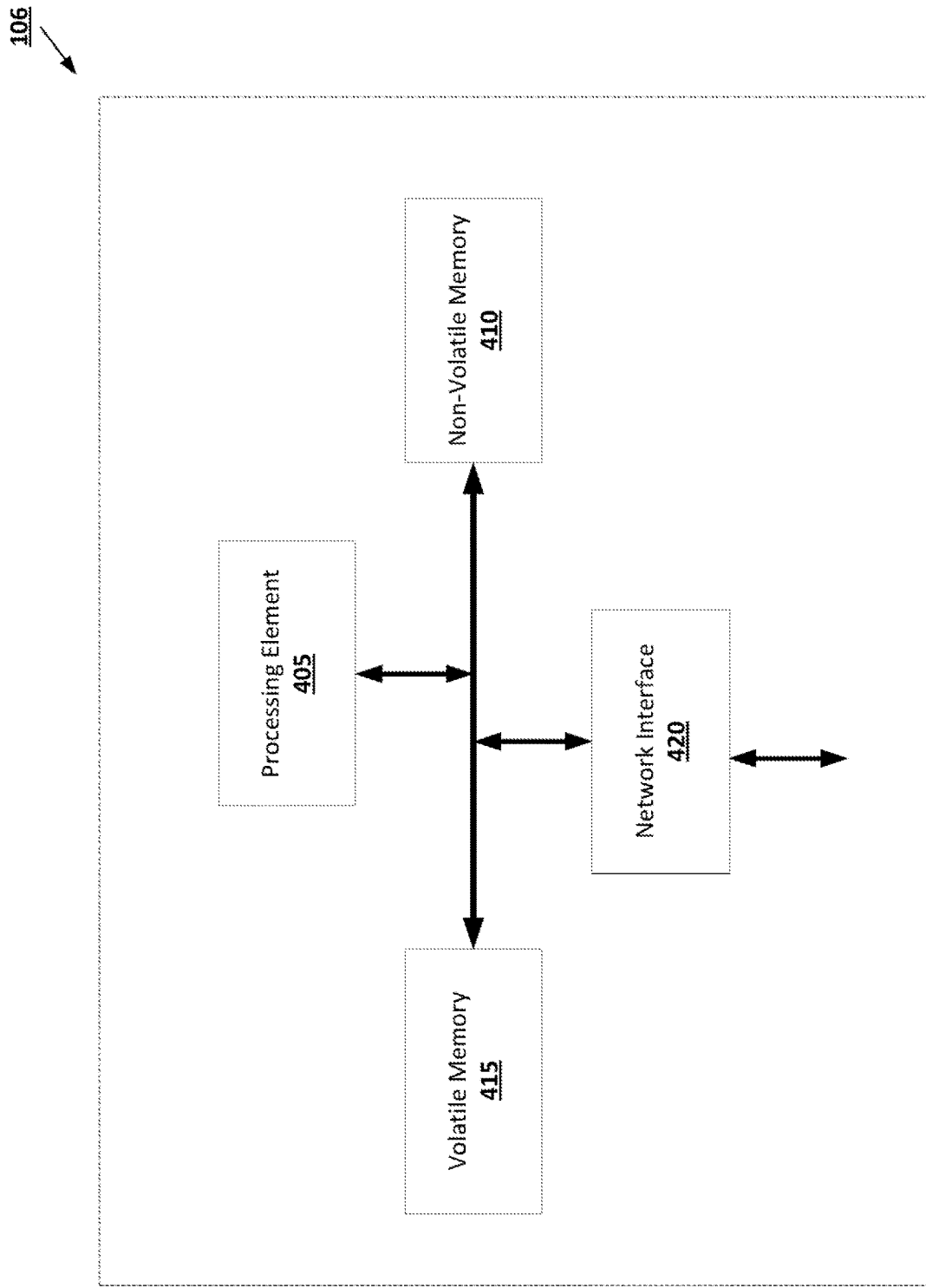

FIG. 4 provides an example output aggregation computing entity in accordance with some embodiments discussed herein.

Figure 5:
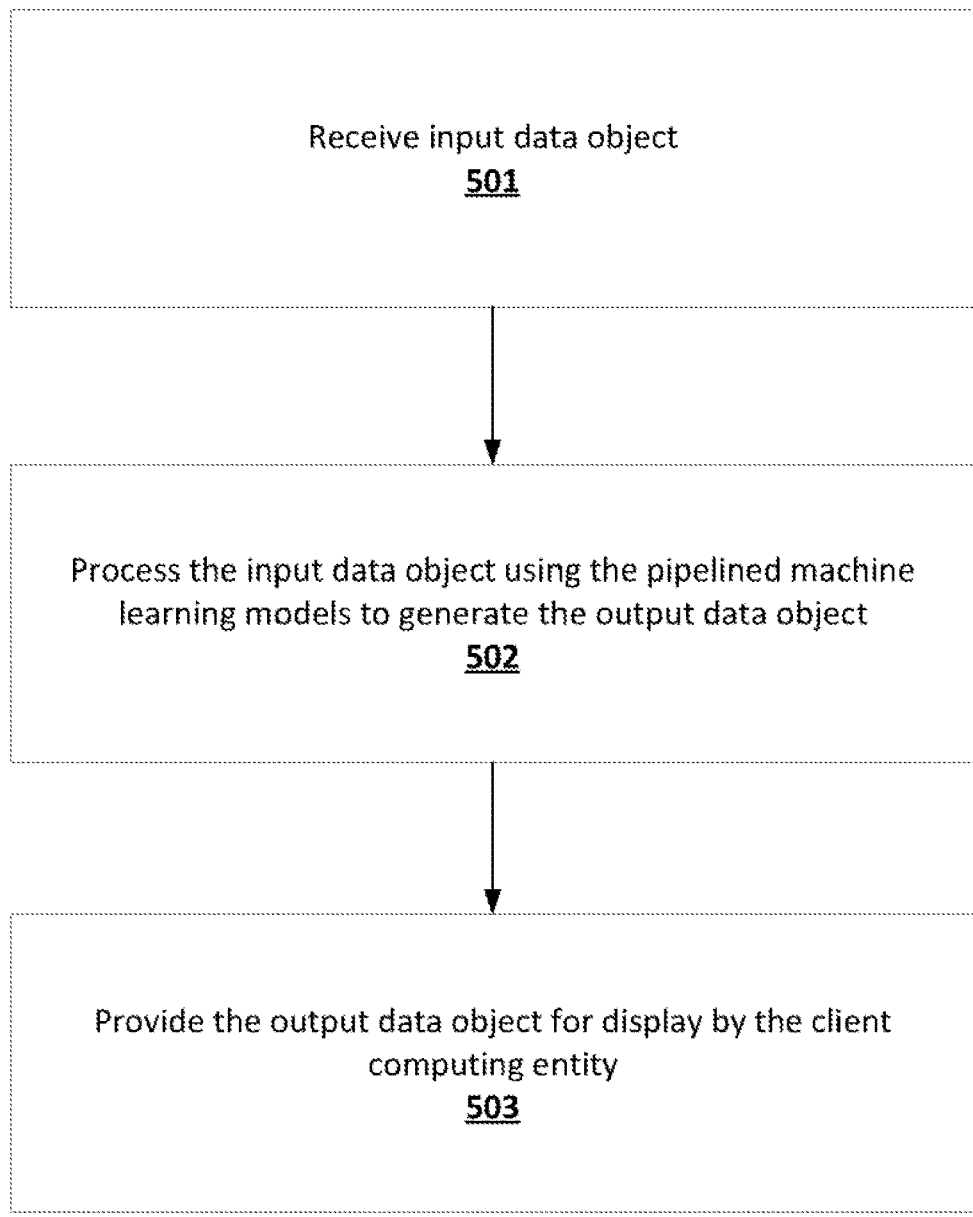

FIG. 5 is a flowchart diagram of an example process for performing predictive data analysis operations based at least in part on an input data object provided by an input provider agent in accordance with some embodiments discussed herein.

Figure 6:
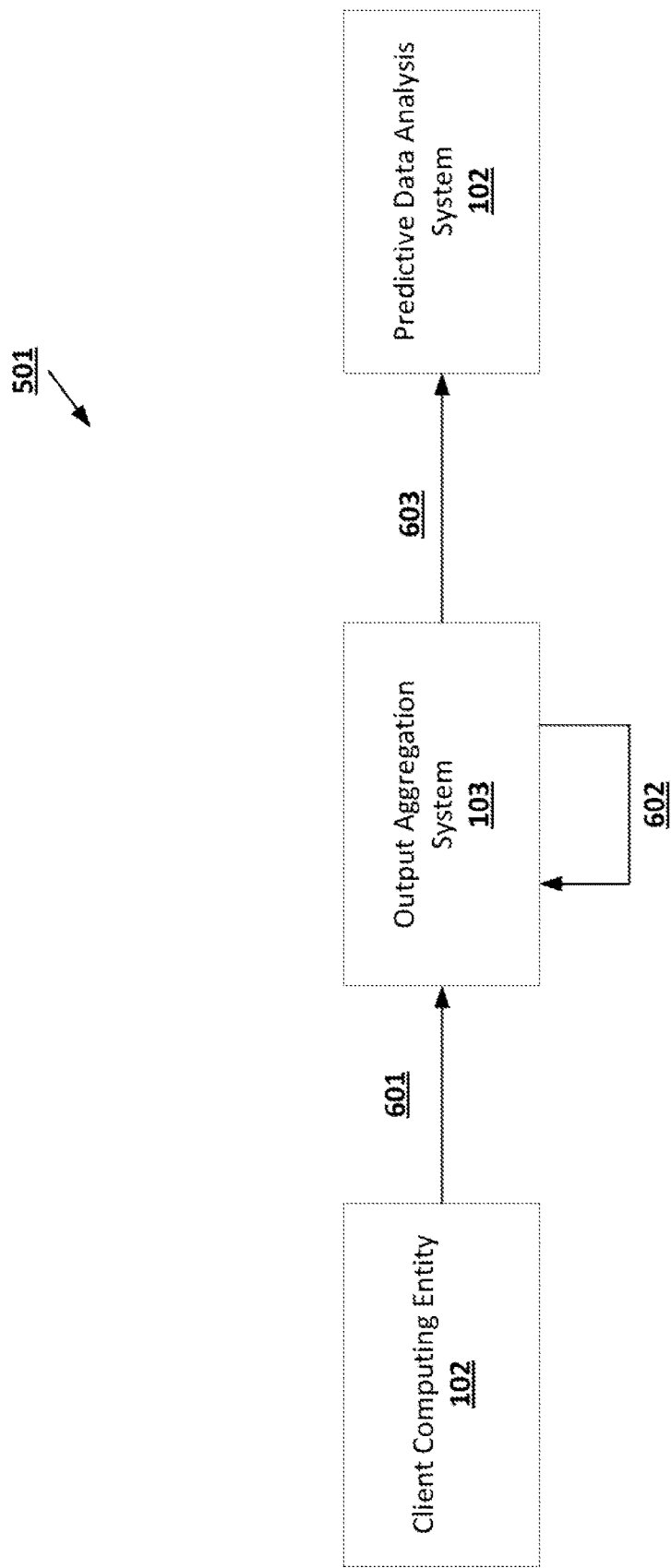

FIG. 6 provides an operational example of receiving an input data object in accordance with some embodiments discussed herein.

Figure 7:
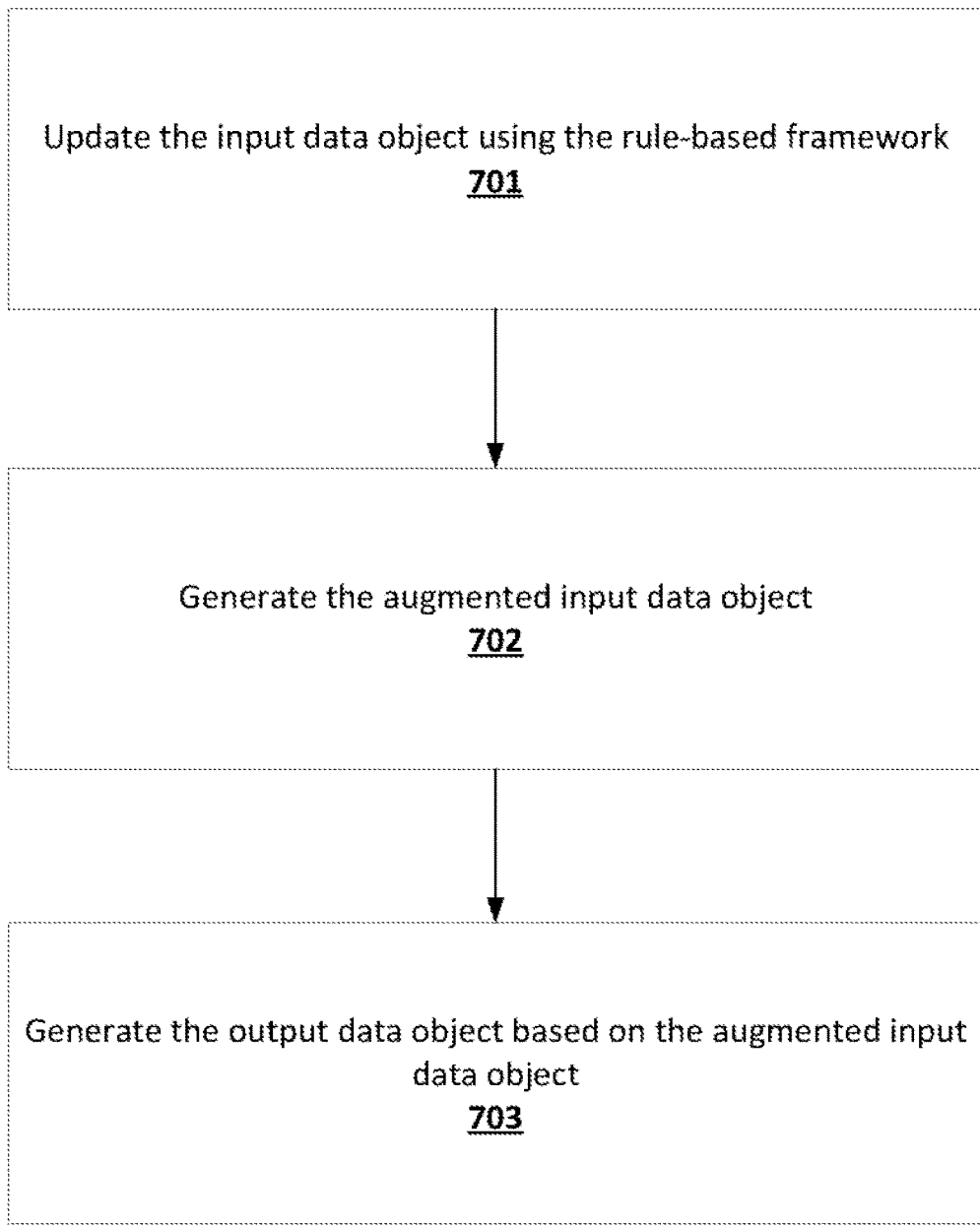

FIG. 7 is a flowchart diagram of an example process for processing an input data object using a plurality of pipelined machine learning models to generate an output data object in accordance with some embodiments discussed herein.

Figure 8:
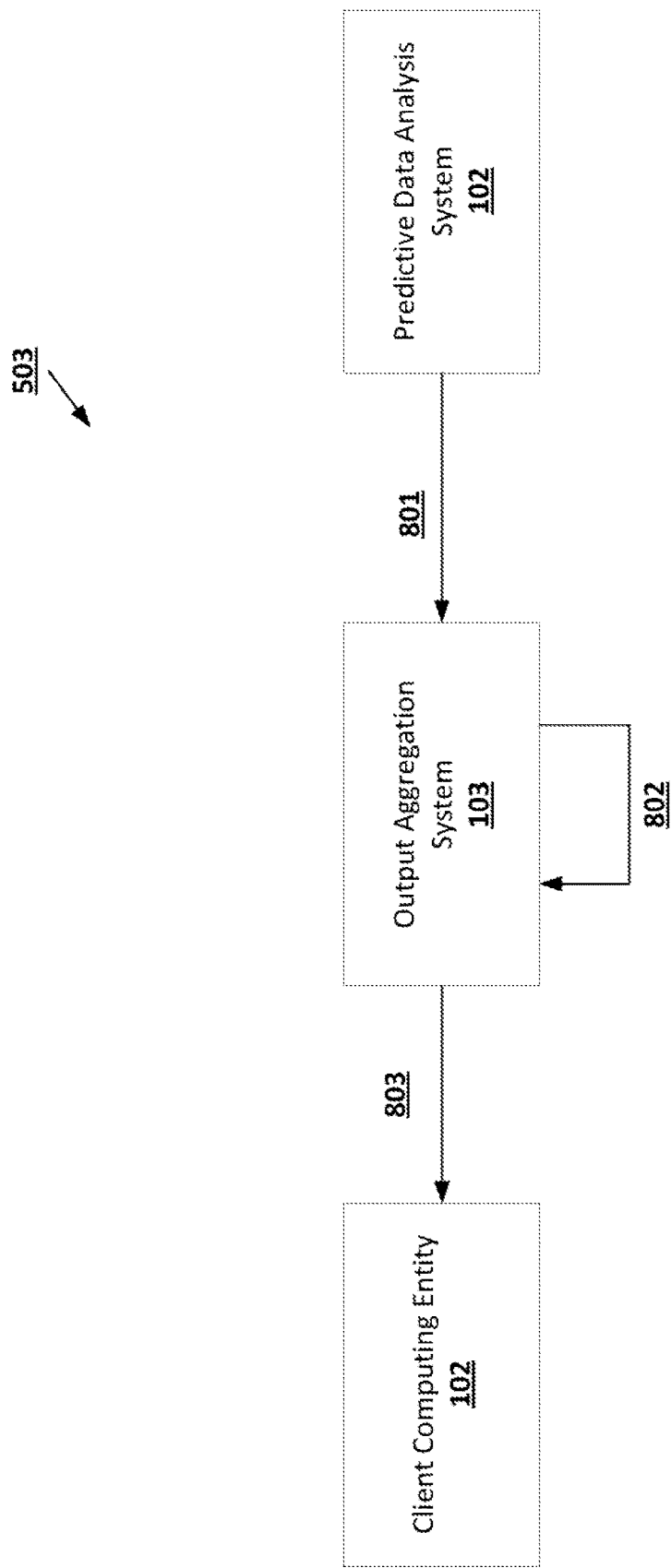

FIG. 8 provides an operational example of providing an output data object to a client computing entity in accordance with some embodiments discussed herein.

Figure 9:
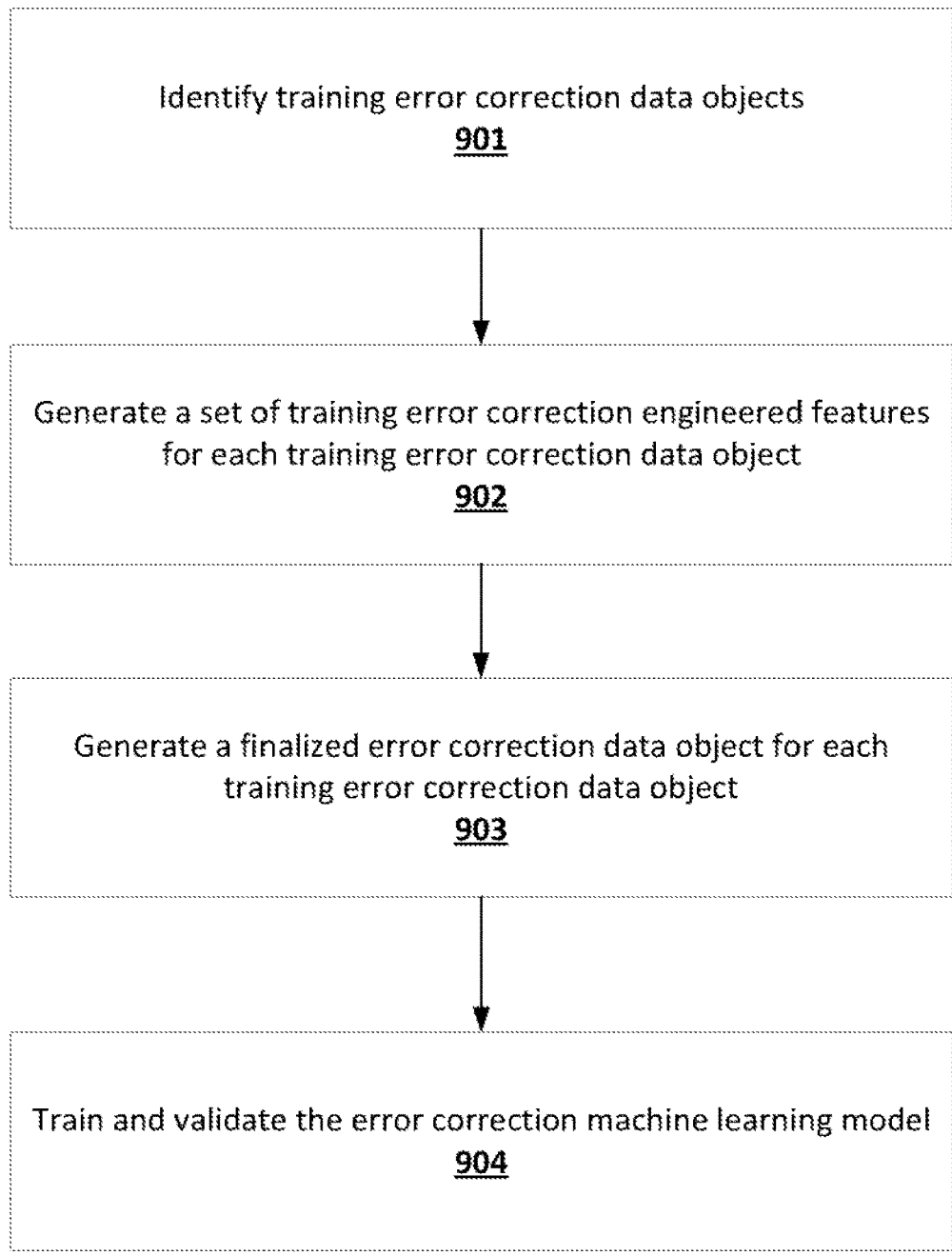

FIG. 9 is a flowchart diagram of an example process for training an error correction machine learning model in accordance with some embodiments discussed herein.

Figure 10:
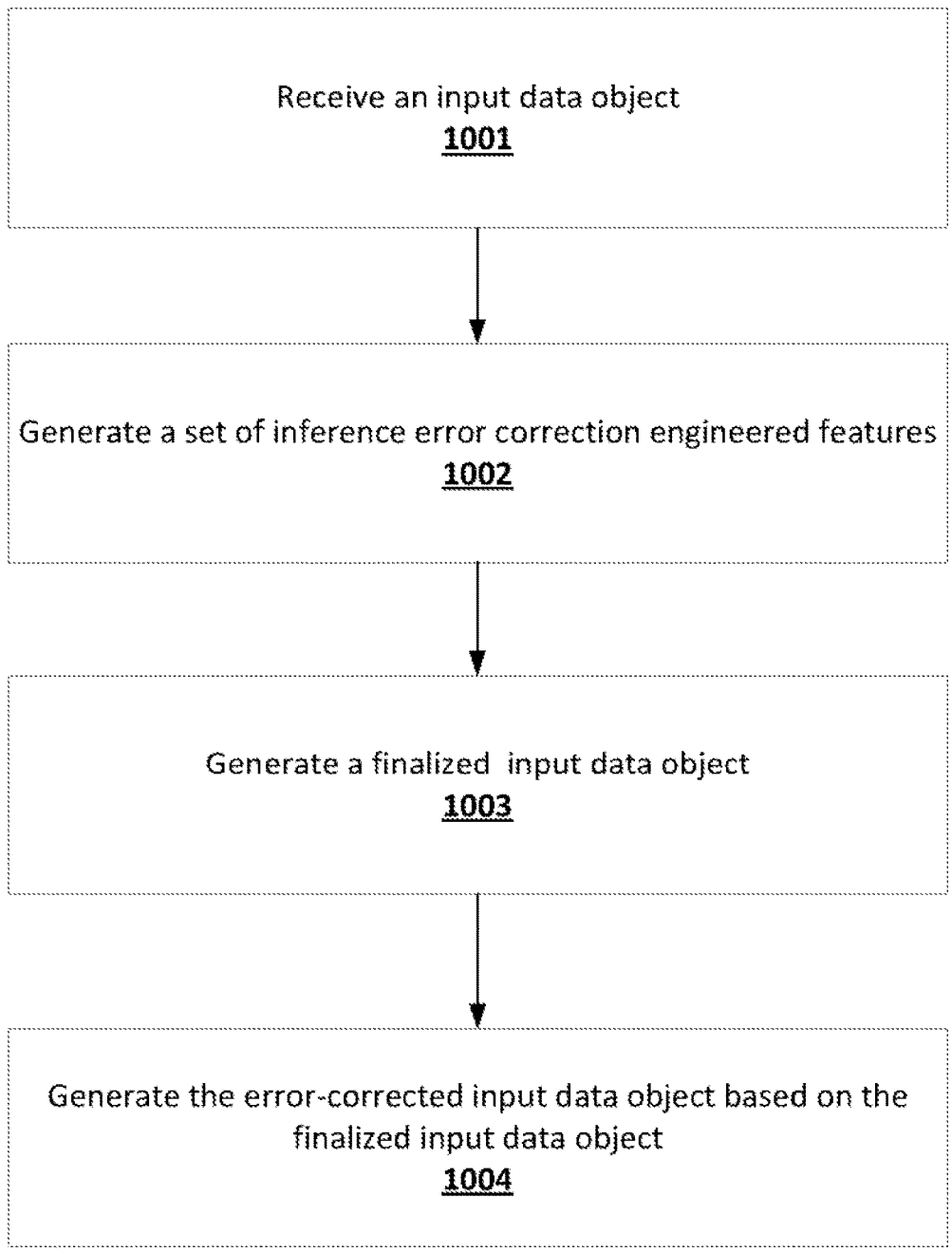

FIG. 10 is a flowchart diagram of an example process for using a trained error correction machine learning model to generate an error-corrected input data object in accordance with some embodiments discussed herein.

Figure 11:
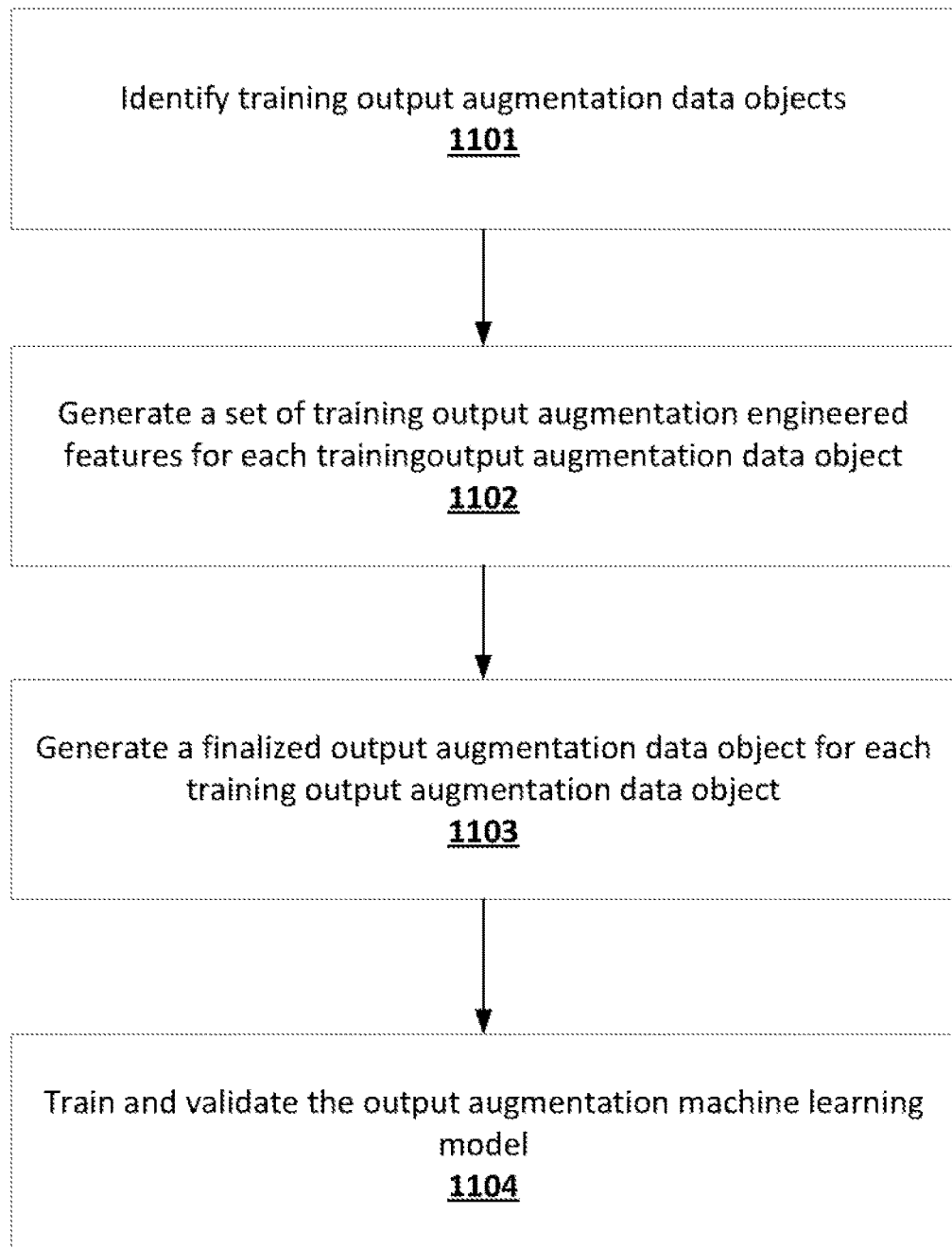

FIG. 11 is a flowchart diagram of an example process for training an output augmentation machine learning model in accordance with some embodiments discussed herein.

Figure 12:
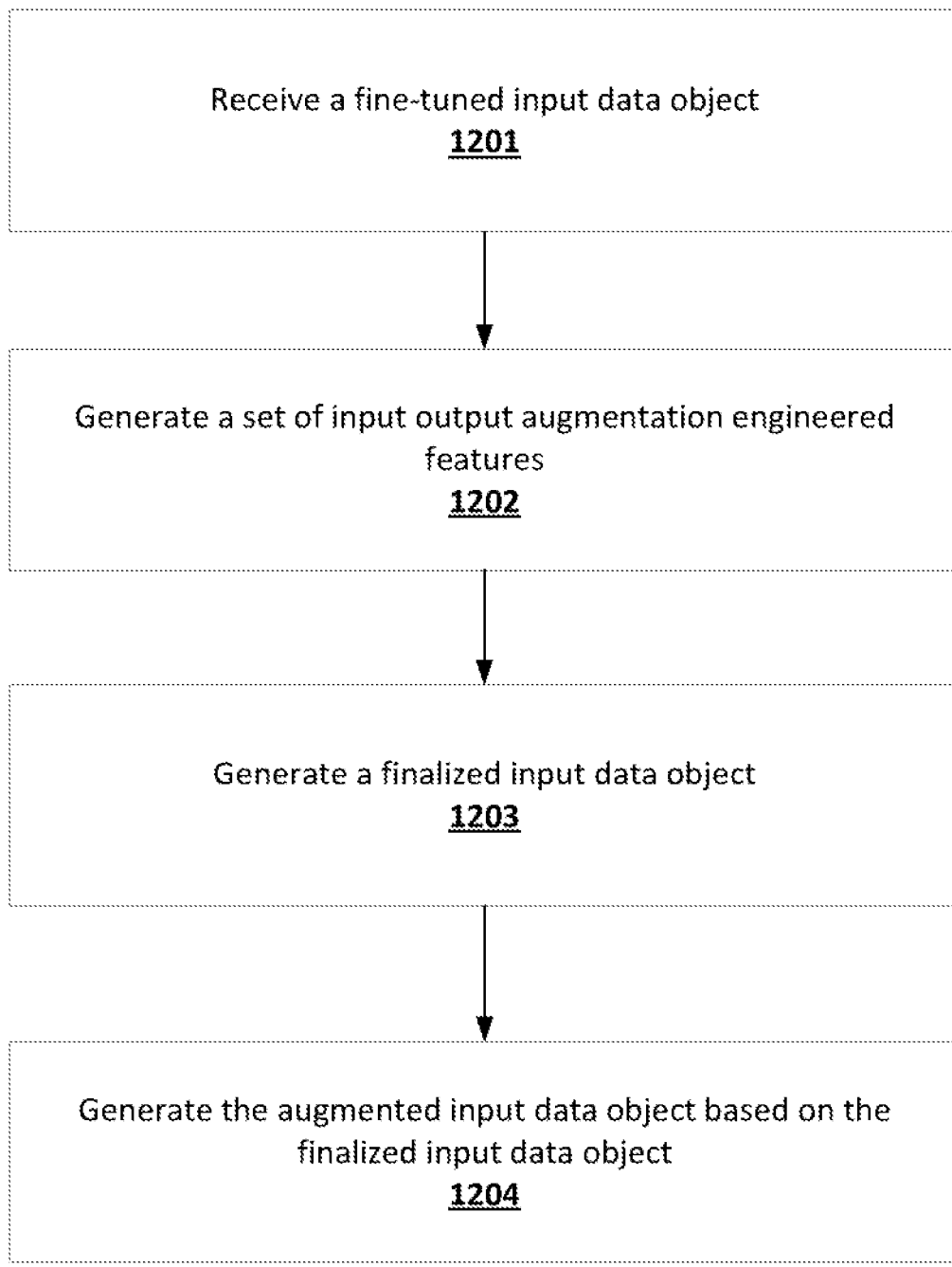

FIG. 12 is a flowchart diagram of an example process for using a trained output augmentation machine learning model to generate an augmented input data object in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW AND TECHNICAL IMPROVEMENTS

Various embodiments of the present invention address technical challenges related to improving efficiency and effectiveness of performing error correction using machine learning models. Various existing error correction machine learning models have substantial efficiency challenges because they need to infer complex patterns across input data objects and compare those complex patterns to inferences about non-anomalous data patterns. These complexities cause various existing error correction machine learning models to require a greater number of training epochs to train. Once trained, the noted error correction machine learning models have accuracy/reliability drawbacks.

Various embodiments of the present invention address the noted challenges associated with efficiency and effectiveness of performing error correction using machine learning models by using error correction machine learning models that process one or more inference error correction engineered features including an agent-based error likelihood value describing an estimated error likelihood of an input provider agent associated with the input data object. Using agent-based error likelihood value describing an estimated error likelihood of an input provider agent associated with the input data object provides significant predictive insights that enable error correction machine learning models disclosed by various embodiments of the present invention to be trained using a fewer number of training epochs, which in turn increases the computational efficiency of performing error correction using those error correction machine learning models as well as the accuracy/reliability performing error correction using those error correction machine learning models.

Various embodiments of the present invention address technical challenges related to improving efficiency and effectiveness of performing output augmentation using machine learning models. Various existing output augmentation machine learning models have substantial efficiency challenges because they need to infer complex patterns associated with whether output data objects need to be augmented to achieve desired outcomes, such as to be selected by target end users. These complexities cause various existing output augmentation machine learning models to require a greater number of training epochs to train and to be less reliable after those output augmentation machine learning models are trained.

Various embodiments of the present invention address the noted challenges associated with efficiency and effectiveness of performing output augmentation using machine learning models by using error correction machine learning models that process one or more inference output augmentation engineered features including an agent-based selection likelihood value describing an estimated likelihood of achievement of a desired outcome if a secondary predictive output is provided along with a primary predictive output as part of the predictive output data object. Using an agent-based selection likelihood values provides significant predictive insights that enable output augmentation machine learning models disclosed by various embodiments of the present invention to be trained using a fewer number of training epochs, which in turn increases the computational efficiency of performing output augmentation using those error correction machine learning models as well as the accuracy/reliability performing output augmentation operations using those error correction machine learning models.

Various embodiments of the present invention address technical challenges related to enabling pipelined machine learning in an efficient and effective manner. Deploying pipelined machine learning models is challenging from an efficiency and reliability standpoint, as such a deployment should be cognizant of the interdependencies and parametric relationships of the deployed models. Various embodiments of the present invention address the noted challenges associated with efficiency and reliability of performing pipelined machine learning by disclosing an architecture that includes an error correction machine learning model that is configured to process the input data object to generate an error-corrected input data object and an output augmentation machine learning model that is configured to process a fine-tuned input data object to generate the augmented input data object, where the fine-tuned input data object is determined based at least in part on the error-corrected input data object. By using the noted techniques, various embodiments of the present invention reduce the number of processing cycles needed to perform pipelined machine learning as well as improve the accuracy of the predictive output data objects generated by a group of pipelined machine learning models.

II. DEFINITIONS

The term "output generation system" may refer to a computer system (i.e., a combination of one or more computing entities, such as a combination of computing entities that are connected via one or more local area networks and/or via one or more wide area networks) that is configured to: (i) receive end-user-initiated queries from one or more client computing entities, (ii) generate input data objects based at least in part on the end-user-initiated queries, (iii) provide the input data objects to one or more output generation server systems that are configured to process the input data objects to generate output data objects and transmit the output data objects to the output generation system, (iv) receive the output data objects from the output generation server systems, and (v) provide the output data objects to the client computing entities. For example, the output generation system may be a computer system that enables access to an electronic comparative rater platform, where the electronic comparative rater platform may enable insurance agents to: (i) receive end-user-initiated queries for insurance rates from client computing entities associated with insurance agents and/or insurance customers, (ii) generate input data objects based at least in part on the end-user-initiated queries, (iii) provide the input data objects to one or more output generation server systems, where each output generation server system is associated with an insurance provider and may be configured to process input data objects to generate output data objects that describe applicable insurance rates for the input data objects, (iv) receive out data objects describing insurance rates from the output generation server systems, and (v) provide the output data objects to the client computing entities associated with the insurance agents and/or insurance customers.

The "input data object" may refer to a data entity that is configured to describe one or more input data fields associated with an end-user-initiate query, where the one or more input data fields may be defined by an applicable schema of an expected/desired input of a predictive data analysis system to which the input data object is provided. As described above, an output aggregation system may be configured to provide input data objects to two or more output generation server systems (e.g., to two or more output generation server systems that are associated with two or more insurance providers). In some of the embodiments in which an output aggregation system provides input data objects to two or more output generation server systems, the output aggregation system may provide the same input data object for a particular end-user-initiated query to the output generation systems. This may for example be the case if the two or more output generation systems utilize a common schema for expected/desired inputs (e.g., according to an industry standard). In some of the embodiments in which an output aggregation system provides input data objects to two or more output generation server systems, the output aggregation system may provide a different input data object to each defined subset of the output generation server systems. For example, given output generation server systems O1, O2, and O3, the output aggregation system may be configured to provide an input data object I1 to output generation server systems O1-O2 and a separate input data object I2 to the output generation server system O3. As described above, an end-user-initiated query may be a request for an insurance rate. In some of the embodiments in which an end-user-initiated query is a request for an insurance rate, the input data object may describe properties of an existing insurance carrier associated with the noted request for insurance rate, including input data fields describing prior insurance tenure of the existing insurance carrier, the prior bodily injury (BI) limits of the existing insurance carrier, prior liabilities incurred by the existing insurance carrier, the foundation type of the existing insurance carrier, and/or the like.

The term "end-user-initiated query" may refer to a data entity that is configured to describe one or more properties associated with a request for a desired output, where the one or more properties are provided by an end user profile (e.g., an insurance agent and/or an insurance customer). As described above, an end-user-initiated query may be a request for an insurance rate. In some of the embodiments in which an end-user-initiated query is a request for an insurance rate, the end-user-initiated query may describe properties of a prospective insurance customer associated with the end-user-initiated query, a desired insurance policy associated with the end-user-initiated query, an existing insurance policy associated with the end-user-initiated query, and/or an existing insurance carrier associated with the end-user-initiated query. Examples of such properties that may be described by an end-user-initiated query for an insurance rate include one or more of the following: a prior carrier name of the existing insurance policy associated with the end-user-initiated query, an insurance quantile of the existing insurance policy associated with the end-user-initiated query, a state of residence of the prospective insurance customer associated with the end-user-initiated query, a requested deductible for the desired insurance policy associated with the end-user-initiated query, an agent quantile of the prospective insurance customer associated with the end-user-initiated query, an insurance agent identifier for the desired insurance policy associated with the end-user-initiated query, a prior tenure of the existing insurance carrier associated with the end-user-initiated query, a residence type of prospective insurance customer associated with the end-user-initiated query, a property damage (PD) limit of the existing insurance policy associated with the end-user-initiated query, and/or the like.

The terms "output data object" and/or "predictive output data object" may refer to a data entity that is configured to describe one or more numerical values corresponding to an input data object that are generated by: (i) processing the input data object using two or more pipelined machine learning models to generate an augmented input data object, and (ii) processing the augmented data object using a rate generation model to generate the one or more numerical values. For example, the output data object may describe one or more insurance rates corresponding to a request for an insurance quote. As described above, the insurance rates may be generated based at least in part on a set of features associated with an end-user-initiated query for an insurance rate, such as at least one of the following: a prior carrier name of the existing insurance policy associated with the end-user-initiated query, an insurance quantile of the existing insurance policy associated with the end-user-initiated query, a state of residence of the prospective insurance customer associated with the end-user-initiated query, a requested deductible for the desired insurance policy associated with the end-user-initiated query, an agent quantile of the prospective insurance customer associated with the end-user-initiated query, an insurance agent identifier for the desired insurance policy associated with the end-user-initiated query, a prior tenure of the existing insurance carrier associated with the end-user-initiated query, a residence type of prospective insurance customer associated with the end-user-initiated query, a property damage (PD) limit of the existing insurance policy associated with the end-user-initiated query, and/or the like. In some embodiments, the one or more insurance rates are generated by: (i) processing the input data object using two or more pipelined machine learning models in order to generate an augmented input data object, and (ii) processing the augmented data object using a rate generation model to generate the one or more numerical values describing the one or more applicable insurance rates.

The term "pipelined machine learning models" may refer to a set of machine learning models that include an error correction machine learning model that is configured to process an input data object to generate an error-corrected input data object as well as an output augmentation machine learning model, where the input to the output augmentation machine learning model is a fine-tuned input data object that is determined based at least in part on the error-corrected input data object. For example, the pipelined machine learning models may include the following arrangement of two machine learning models: an error correction machine learning model that is configured to process an input data object to generate an error-corrected input data object followed by an output augmentation machine learning model that is configured to process the error-corrected input data object to generate the augmented input data object. As another example, the pipelined machine learning models may include the following arrangement of three or more machine learning models: an error correction machine learning model that is configured to process an input data object to generate an error-corrected input data object, followed by one or more other machine learning models that are collectively configured to process the error-corrected input data object to generate a refined input data object, and followed by an output augmentation machine learning model that is configured to process the refined input data object to generate the augmented input data object.

The term "error correction machine learning model" may refer to a data entity that is configured to describe a machine learning model that is configured to process an input data object in order to generate an error-corrected input data object. For example, the error correction machine learning model may be configured to process an input data object having n selected input data fields to determine, for each of n selected input data fields, a per-field error likelihood value that describes the likelihood that the value of the input data field has been erroneously recorded to be lower than the actual value for the input data field, and then generate the error-corrected input data object based at least in part on each per-field error likelihood value. As another example, the error correction machine learning model may be configured to process an input data object having n selected input data fields to determine, for each of the n selected input data fields, a per-field error likelihood value that describes the likelihood that the value of the input data field has been erroneously recorded to be higher than the actual value for the input data field, and then generate the error-corrected input data object based at least in part on each per-field error likelihood value. As yet another example, the error correction machine learning model may be configured to process an input data object having n selected input data fields to determine, for each of the n selected input data fields, a per-field error likelihood value that describes the likelihood that the value of the input data field has been erroneously recorded to be different from the actual value for the input data field, and then generate the error-corrected input data object based at least in part on each per-field error likelihood value. As a further example, the error correction machine learning model may be configured to process an input data object having n selected input data fields to determine, for each of the n selected input data fields, a per-field error likelihood value that describes the likelihood that the value of the input data field has been erroneously recorded to be substantially different from the actual value for the input data field, where the difference between a recorded value for an input data field and an actual value for the input data field may be deemed substantial if the noted difference exceeds a difference threshold, and then generate the error-corrected input data object based at least in part on each per-field error likelihood value.

The term "error-corrected input data object" may refer to a data entity having the same arrangement of input data fields as a corresponding input data object, where the input data fields of the input data fields of the error-corrected input data object have been corrected in accordance with each per-field error likelihood value associated with the input data object as determined via processing the input data object using an error correction machine learning model. For example, if an input data object includes the input data fields F1, F2, and F3, and if the per-field error likelihood value for the input data field F1 describes sufficient likelihood that the input data field likely has an actual value that is higher than the recorded value for the input data field F2, the per-field error likelihood value for the input data field F1 describes insufficient likelihood that the input data field likely has an actual value that is higher than the recorded value for the input data field F2, and the per-field error likelihood value for the input data field F3 describes insufficient likelihood that the input data field likely has an actual value that is higher than the recorded value for the input data field F3, then the error-corrected input data object may include an upward-adjusted value for the input data field F1, the recorded data value for the input data field F2, and the recorded data value for the input data field F3.

The term "output augmentation machine learning model" may refer to a machine learning model that is configured to process a fine-tuned input data object (e.g., an error-corrected input data object and/or a refined input data object that is determined based at least in part on the error-corrected input data object) to generate an augmented input data object. For example, the output augmentation machine learning model may be configured to: (i) process the fine-tuned input data object to generate a secondary output necessity prediction that describes whether a primary predictive output described by an output data object corresponding to the fine-tuned input data object will likely fail to achieve a desired outcome, (ii) for each of a group of potential adjustments to the primary predictive output, generate a per-adjustment outcome propensity prediction describing whether the potential adjustment will increase the likelihood of the achievement of the desired outcome, and (iii) generate the augmented input data object based at least in part on the fine-tuned input data object, the secondary output necessity prediction, and each per-adjustment outcome propensity prediction.

The term "augmented input data object" may refer to a data entity that is configured to describe the input data fields of a fine-tuned input data object associated with an input data object as well as at least one of the following: (i) generate a secondary output necessity prediction that describes whether a primary predictive output described by an output data object corresponding to the fine-tuned input data object will likely fail to achieve a desired outcome, and (ii) for each of a group of potential adjustments to the primary predictive output, a per-adjustment outcome propensity prediction describing whether the potential adjustment will increase the likelihood of the achievement of the desired outcome. For example, the augmented input data object may describe one of the following: (i) a positive secondary output necessity prediction describing that a primary predictive output described by an output data object corresponding to the fine-tuned input data object will likely fail to achieve a desired outcome along with, for each of a group of potential adjustments to the primary predictive output, a per-adjustment outcome propensity prediction describing whether the potential adjustment will increase the likelihood of the achievement of the desired outcome; or (ii) a negative secondary output necessity prediction describing that a primary predictive output described by an output data object corresponding to the fine-tuned input data object will not likely fail to achieve a desired outcome.

The term "training error correction data object" may refer to a data entity that is configured to describe an input data object having m input data fields and, for each input data field of a subset of (e.g., n of) the m input data fields, a ground-truth per-field error descriptor that describes the likelihood that the value of the input data field has been erroneously recorded to have a particle magnitude-based relationship with the actual value for the input data field. For example, an training error correction data object may describe an input data object having m input data fields and, for each input data field of a subset of (e.g., n of) the m input data fields, a per-field error likelihood value that describes the likelihood that the value of the input data field has been erroneously recorded to be lower than the actual value for the input data field. As another example, an training error correction data object may describe an input data object having m input data fields and, for each input data field of a subset of (e.g., n of) the m input data fields, a per-field error likelihood value that describes the likelihood that the value of the input data field has been erroneously recorded to be higher than the actual value for the input data field. As yet another example, an training error correction data object may describe an input data object having m input data fields and, for each input data field of a subset of (e.g., n of) the m input data fields, a per-field error likelihood value that describes the likelihood that the value of the input data field has been erroneously recorded to be different from the actual value for the input data field. As a further example, an training error correction data object may describe an input data object having m input data fields and, for each input data field of a subset of (e.g., n of) the m input data fields, a per-field error likelihood value that describes the likelihood that the value of the input data field has been erroneously recorded to be different from the actual value for the input data field, where the difference between a recorded value for an input data field and an actual value for the input data field may be deemed substantial if the noted difference exceeds a difference threshold. In some embodiments, the ground-truth per-field error descriptors described by the training data objects are determined based at least in part on historical data about whether recorded values provided by input data objects were subsequently corrected after ground-truth data about those recorded values were retrieved. For example, the ground-truth per-field error descriptor for an input data field corresponding to a prior tenure field of an input data object may be determined based at least in part on whether the prior tenure field value provided by the input data object was revised by a subsequently-retrieved insurance history report associated with the input data object.

The term "training error correction engineered feature" may refer to a data entity that is configured to describe a feature that is configured to be encoded to generate an input to an error correction machine learning model either during training of the error correction machine learning model. Examples of training error correction engineered features for an training error correction data object include: (i) for each selected input data field of n selected input data fields of the training error correction data object, a per-field-type error likelihood value that describes an estimated likelihood that the selected input data field is erroneous given the input data field type of the selected input data field (e.g., for a selected input data field that is associated with a prior tenure input data field type, a per-field-type error likelihood value that is determined based at least in part on the ratio of observed erroneous recordation of values for the prior tenure input data field type), (ii) an agent-based error likelihood value that describes an estimated likelihood that the input provider agent (e.g., the insurance agent) associated with the training error correction data object provides erroneous information (e.g., an agent-based error likelihood value determined based at least in part on the ratio of erroneous data entries by the input provider agent that is associated with the training error correction data object), (iii) for a selected input data field of the training error correction data object that describes a prior tenure bucket, a value that describes how often the prior tenure bucket changes to predict specific prior tenure changes, and (iv) for a selected input data field of the training error correction data object that describes a prior coverage limit (e.g., a prior bodily injury limit), a value that describes how often the prior coverage limit changes to predict specific prior tenure changes.

The term "inference error correction engineered feature" may refer to a data entity that is configured to describe a feature that is configured to be encoded to generate an input to an error correction machine learning model during a predictive inference performed by the error correction machine learning model subsequent to training of the error correction machine learning. Examples of inference error correction engineered features for an input data object include: (i) for each selected input data field of n selected input data fields of the input data object, a per-field-type error likelihood value that describes the likelihood that selected input data field is erroneous given the input data field type of the selected input data field (e.g., for a selected input data field that is associated with a prior tenure input data field type, a per-field-type error likelihood value that is determined based at least in part on the ratio of observed erroneous recordation of values for the prior tenure input data field type), (ii) an agent-based error likelihood value that describes a likelihood that the input provider agent (e.g., the insurance agent) associated with the input data object provides erroneous information (e.g., an agent-based error likelihood value determined based at least in part on the ratio of erroneous data entries by the input provider agent that is associated with the training error correction data object), (iii) for a selected input data field of the training error correction data object that describes a prior tenure bucket, a value that describes how often the prior tenure bucket changes to predict specific prior tenure changes, and (iv) for a selected input data field of the training error correction data object that describes a prior coverage limit (e.g., a prior bodily injury limit), a value that describes how often the prior coverage limit changes to predict specific prior tenure changes.

The term "training output augmentation data object" may refer to a data entity that is configured to describe a fine-tuned input data object along with a ground-truth secondary output necessity descriptor describing an observed ratio of occurrences of instances in which inclusion of a secondary predictive output along with a primary prediction corresponding to the fine-tuned data object (e.g., inclusion of a secondary insurance rate along with a primary insurance rate corresponding to the fine-tuned data object) has achieved a desired outcome (e.g., clicking/selecting of the secondary insurance rate by an insurance agent). In some embodiments, the output augmentation training data objects are generated by providing secondary predictive outputs as part of output data objects for randomly-selected input data objects to end users and observing end-user reaction toward the secondary predictive outputs (e.g., the selection ratios for the secondary predictive outputs). For example, if 40 percent of end users select a secondary predictive output when presented along with a primary predictive output, then the fine-tuned input data object associated with the primary predictive output may have a ground-truth secondary output necessity descriptor of 0.40.

The term "training output augmentation engineered feature" may refer to a data entity that is configured to describe a feature that is configured to be provided as an input to an output augmentation machine learning model either during training of the output augmentation machine learning model. Examples of training output augmentation engineered features for an output augmentation training data object include an agent-based selection likelihood value that describes a likelihood that the input provider agent (e.g., the insurance agent) associated with the output augmentation training data object clicks/selects a secondary predictive output associated with the output augmentation training data object (e.g., an agent-based selection likelihood value determined based at least in part on the past clicking/selection behavior of the input provider agent associated with the output augmentation training data object).

The term "inference output augmentation engineered feature" may refer to a data entity that is configured to describe a feature that is configured to be provided as an input to an output augmentation machine learning model during an inference performed using a trained output augmentation machine learning model. Examples of inference output augmentation engineered features for an output augmentation training data object include an agent-based selection likelihood value that describes a likelihood that the input provider agent (e.g., the insurance agent) associated with the fine-tuned input data object clicks/selects a secondary predictive output associated with the output augmentation training data object (e.g., an agent-based selection likelihood value determined based at least in part on the past clicking/selection behavior of the input provider agent associated with the output augmentation training data object).

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive input data objects from an output aggregation system 103, where the input data objects are generated by the output aggregation system 103 based on end-user-initiated queries provided by the client computing entities 102 to the output aggregation system 103. The predictive data analysis system 101 may include one or more predictive data analysis computing entities, such as the predictive data analysis computing entity A 106A, the predictive data analysis computing entity B 106B, and the predictive data analysis computing entity N 106N. The output aggregation system 103 may include one or more output aggregation computing entities, such as the output aggregation computing entity A 110A, the output aggregation computing entity B 110B, and the output aggregation computing entity N 110N.

In some embodiments, predictive data analysis system 101 may communicate with at least one of the client computing entities 102 and/or the output aggregation system 103 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a storage subsystem. The storage subsystem may be configured to store input data used by the predictive data analysis system 101 to perform predictive data analysis as well as model definition data used by the predictive data analysis system 101 to perform various predictive data analysis tasks. The storage subsystem may include one or more storage units, such as multiple distributed storage units that are connected through a computer network. Each storage unit in the storage subsystem may store at least one of one or more data assets and/or one or more data about the computed properties of one or more data assets. Moreover, each storage unit in the storage subsystem may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

C. Exemplary Output Aggregation Computing Entity

FIG. 4 provides a schematic of an output aggregation computing entity 110 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the output aggregation computing entity 110 may also include one or more communications interfaces 420 for communicating with various computing entities, such as by communicating data, content, information, and/or similar terms used herein interchangeably that can be transmitted, received, operated on, processed, displayed, stored, and/or the like.

As shown in FIG. 4, in one embodiment, the predictive data analysis computing entity 106 may include, or be in communication with, one or more processing elements 405 (also referred to as processors, processing circuitry, and/or similar terms used herein interchangeably) that communicate with other elements within the output aggregation computing entity 110 via a bus, for example. As will be understood, the processing element 405 may be embodied in a number of different ways.

For example, the processing element 405 may be embodied as one or more complex programmable logic devices (CPLDs), microprocessors, multi-core processors, coprocessing entities, application-specific instruction-set processors (ASIPs), microcontrollers, and/or controllers. Further, the processing element 405 may be embodied as one or more other processing devices or circuitry. The term circuitry may refer to an entirely hardware embodiment or a combination of hardware and computer program products. Thus, the processing element 405 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 405 may be configured for a particular use or configured to execute instructions stored in volatile or non-volatile media or otherwise accessible to the processing element 405. As such, whether configured by hardware or computer program products, or by a combination thereof, the processing element 405 may be capable of performing steps or operations according to embodiments of the present invention when configured accordingly.

In one embodiment, the output aggregation computing entity 110 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 410, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the output aggregation computing entity 110 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 415, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the output aggregation computing entity 110 with the assistance of the processing element 405 and operating system.

As indicated, in one embodiment, the output aggregation computing entity 110 may also include one or more communications interfaces 420 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the output aggregation computing entity 110 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the output aggregation computing entity 110 may include, or be in communication with, one or more input elements, such as a keyboard input, a mouse input, a touch screen/display input, motion input, movement input, audio input, pointing device input, joystick input, keypad input, and/or the like. The output aggregation computing entity 110 may also include, or be in communication with, one or more output elements (not shown), such as audio output, video output, screen/display output, motion output, movement output, and/or the like.

V. EXEMPLARY SYSTEM OPERATIONS

Various embodiments of the present invention address technical challenges related to enabling pipelined machine learning in an efficient and effective manner. Deploying pipelined machine learning models is challenging from an efficiency and reliability standpoint, as such as a deployment should be cognizant of the interdependencies and parametric relationships of the deployed models. Various embodiments of the present invention address the noted challenges associated with efficiency and reliability of performing pipelined machine learning by disclosing an architecture that includes an error correction machine learning model that is configured to process the input data object to generate an error-corrected input data object and an output augmentation machine learning model that is configured to process a fine-tuned input data object to generate the augmented input data object, where the fine-tuned input data object is determined based at least in part on the error-corrected input data object. By using the noted techniques, various embodiments of the present invention reduce the number of processing cycles needed to perform pipelined machine learning as well as improve the accuracy of the predictive output data objects generated by a group of pipelined machine learning models.

However, while various embodiments of the present invention disclose using error correction machine learning models and output augmentation machine learning models in combination, a person of ordinary skill in the relevant technology will recognize that error correction machine learning models may be used without output augmentation machine learning models and/or that output augmentation machine learning models may be used without error correction machine learning models. Moreover, while various embodiments of the present invention disclose combining error correction machine learning models and output augmentation machine learning models in a particular pipelined architecture, a person of ordinary skill in the relevant technology will recognize that error correction machine learning models and output augmentation machine learning models may be combined in non-pipelined architectures and/or using pipelined architectures that are different from the particular pipelined architecture that is described here.

A. Pipelined Machine Learning Frameworks

FIG. 5 is a flowchart diagram of an example process 500 for performing predictive data analysis operations based at least in part on an input data object provided by an input provider agent. Via the various steps/operations of the process 500, the predictive data analysis system 101 can efficiently and effectively utilize multiple machine learning frameworks in a coordinated manner to perform input data correction and output augmentation as part of generating an output data object corresponding to the input data object.

The process 500 begins at step/operation 501 when the predictive data analysis system 101 receives the input data object from an output aggregation system 103. In some embodiments, the output aggregation system 103 generates the input data object based at least in part on end-user-initiated query data provided by a client computing entity 102. While various embodiments of the present invention describe that the predictive data analysis system 101 receives input data objects from an output aggregation system 103, a person of ordinary skill in the relevant technology will recognize that the predictive data analysis system 101 may receive the input data objects directly from the client computing entities 102.

An output generation system may be a computer system (i.e., a combination of one or more computing entities, such as a combination of computing entities that are connected via one or more local area networks and/or via one or more wide area networks) that is configured to: (i) receive end-user-initiated queries from one or more client computing entities, (ii) generate input data objects based at least in part on the end-user-initiated queries, (iii) provide the input data objects to one or more output generation server systems that are configured to process the input data objects to generate output data objects and transmit the output data objects to the output generation system, (iv) receive the output data objects from the output generation server systems, and (v) provide the output data objects to the client computing entities. For example, the output generation system may be a computer system that enables access to an electronic comparative rater platform, where the electronic comparative rater platform may enable insurance agents to: (i) receive end-user-initiated queries for insurance rates from client computing entities associated with insurance agents, (ii) generate input data objects based at least in part on the end-user-initiated queries, (iii) provide the input data objects to one or more output generation server systems, where each output generation server system is associated with an insurance provider and may be configured to process input data objects to generate output data objects that describe applicable insurance rates for the input data objects, (iv) receive out data objects describing insurance rates from the output generation server systems, and (v) provide the output data objects to the client computing entities associated with the insurance agents.

An input data object may describe one or more input data fields associated with an end-user-initiate query, where the one or more input data fields may be defined by an applicable schema of an expected/desired input of a predictive data analysis system to which the input data object is provided. As described above, an output aggregation system may be configured to provide input data objects to two or more output generation server systems (e.g., to two or more output generation server systems that are associated with two or more insurance providers). In some of the embodiments in which an output aggregation system provides input data objects to two or more output generation server systems, the output aggregation system may provide the same input data object for a particular end-user-initiated query to the output generation systems. This may for example be the case if the two or more output generation systems utilize a common schema for expected/desired inputs (e.g., according to an industry standard). In some of the embodiments in which an output aggregation system provides input data objects to two or more output generation server systems, the output aggregation system may provide a different input data object to each defined subset of the output generation server systems. For example, given output generation server systems O1, O2, and O3, the output aggregation system may be configured to provide an input data object I1 to output generation server systems O1-O2 and a separate input data object I2 to the output generation server system O3. As described above, an end-user-initiated query may be a request for an insurance rate. In some of the embodiments in which an end-user-initiated query is a request for an insurance rate, the input data object may describe properties of an existing insurance carrier associated with the noted request for insurance rate, including input data fields describing prior insurance tenure of the existing insurance carrier, the prior bodily injury (BI) limits of the existing insurance carrier, prior liabilities incurred by the existing insurance carrier, the foundation type of the existing insurance carrier, and/or the like.

In some embodiments, some aspects of the step/operation 501 may be performed in accordance with the process that is depicted in FIG. 6. As depicted in FIG. 6, the depicted process begins at step/operation 601 when the output aggregation system 103 receives the end-user-initiated query from the client computing entity 102. As described above, an end-user-initiated query may be a request for an insurance rate. In some of the embodiments in which an end-user-initiated query is a request for an insurance rate, the end-user-initiated query may describe properties of a prospective insurance customer associated with the end-user-initiated query, a desired insurance policy associated with the end-user-initiated query, an existing insurance policy associated with the end-user-initiated query, and/or an existing insurance carrier associated with the end-user-initiated query. Examples of such properties that may be described by an end-user-initiated query for an insurance rate include: a prior carrier name of the existing insurance policy associated with the end-user-initiated query, an insurance quantile of the existing insurance policy associated with the end-user-initiated query, a state of residence of the prospective insurance customer associated with the end-user-initiated query, a requested deductible for the desired insurance policy associated with the end-user-initiated query, an agent quantile of the prospective insurance customer associated with the end-user-initiated query, an insurance agent identifier for the desired insurance policy associated with the end-user-initiated query, a prior tenure of the existing insurance carrier associated with the end-user-initiated query, a residence type of prospective insurance customer associated with the end-user-initiated query, a property damage (PD) limit of the existing insurance policy associated with the end-user-initiated query, and/or the like.

At step/operation 602, the output aggregation system 103 generates the input data object based at least in part on the end-user-initiated query. For example, the output aggregation system 103 may generate an extensible markup language (XML) data object based at least in part on the end-user-initiated query. In some embodiments, prior to generating the input data object, the output aggregation system 103 may: (i) extract a first set of input data fields from the end-user-initiated query, and (ii) supplement the first set of input data fields based at least in part on a second of input data fields inferred based at least in part on historical/profile data maintained by the output aggregation system, such as historical/profile data inferred based at least in part on at least one of a prospective insurance customer associated with the end-user-initiated query, a desired insurance policy associated with the end-user-initiated query, an existing insurance policy associated with the end-user-initiated query, and/or an existing insurance carrier associated with the end-user-initiated query. Examples of input data fields that may be inferred based at least in part on historical/profile data maintained by an output aggregation system 103 include at least one of the following: a prior carrier name of the existing insurance policy associated with the end-user-initiated query, an insurance quantile of the existing insurance policy associated with the end-user-initiated query, a state of residence of the prospective insurance customer associated with the end-user-initiated query, a requested deductible for the desired insurance policy associated with the end-user-initiated query, an agent quantile of the prospective insurance customer associated with the end-user-initiated query, an insurance agent identifier for the desired insurance policy associated with the end-user-initiated query, a prior tenure of the existing insurance carrier associated with the end-user-initiated query, a residence type of prospective insurance customer associated with the end-user-initiated query, a property damage (PD) limit of the existing insurance policy associated with the end-user-initiated query, and/or the like.

At step/operation 603, the output aggregation system 103 provides the input data object to the predictive data analysis system 101. As described above, the output aggregation system 103 may be configured to: (i) receive end-user-initiated queries from one or more client computing entities, (ii) generate input data objects based at least in part on the end-user-initiated queries, (iii) provide the input data objects to one or more output generation server systems that are configured to process the input data objects to generate output data objects and transmit the output data objects to the output generation system, (iv) receive the output data objects from the output generation server systems, and (v) provide the output data objects to the client computing entities. As further described above, examples of output generation server systems include server systems that are configured to generate applicable rates for input data objects that correspond to insurance rates. The predictive data analysis system 101 is an example of such an output generation system.

In some embodiments, the predictive data analysis system 101 may be configured to generate an insurance rate based at least in part on a set of features associated with an end-user-initiated query for an insurance rate, such as at least one of the following: a prior carrier name of the existing insurance policy associated with the end-user-initiated query, an insurance quantile of the existing insurance policy associated with the end-user-initiated query, a state of residence of the prospective insurance customer associated with the end-user-initiated query, a requested deductible for the desired insurance policy associated with the end-user-initiated query, an agent quantile of the prospective insurance customer associated with the end-user-initiated query, an insurance agent identifier for the desired insurance policy associated with the end-user-initiated query, a prior tenure of the existing insurance carrier associated with the end-user-initiated query, a residence type of prospective insurance customer associated with the end-user-initiated query, a property damage (PD) limit of the existing insurance policy associated with the end-user-initiated query, and/or the like.

Returning to FIG. 5, at step/operation 502, the predictive data analysis system 101 performs predictive processing on the input data object to generate the output data object corresponding to the input data object. The output data object may describe one or more numerical values corresponding to the input data object that are generated by: (i) processing the input data object using two or more pipelined machine learning models to generate an augmented input data object, and (ii) processing the augmented data object using a rate generation model to generate the one or more numerical values. For example, the output data object may describe one or more insurance rates corresponding to a request for an insurance quote. As described above, the insurance rates may be generated based at least in part on a set of features associated with an end-user-initiated query for an insurance rate, such as at least one of the following: a prior carrier name of the existing insurance policy associated with the end-user-initiated query, an insurance quantile of the existing insurance policy associated with the end-user-initiated query, a state of residence of the prospective insurance customer associated with the end-user-initiated query, a requested deductible for the desired insurance policy associated with the end-user-initiated query, an agent quantile of the prospective insurance customer associated with the end-user-initiated query, an insurance agent identifier for the desired insurance policy associated with the end-user-initiated query, a prior tenure of the existing insurance carrier associated with the end-user-initiated query, a residence type of prospective insurance customer associated with the end-user-initiated query, a property damage (PD) limit of the existing insurance policy associated with the end-user-initiated query, and/or the like. In some embodiments, the one or more insurance rates are generated by: (i) processing the input data object using two or more pipelined machine learning models in order to generate an augmented input data object, and (ii) processing the augmented data object using a rate generation model to generate the one or more numerical values describing the one or more applicable insurance rates.

In some embodiments, step/operation 502 may be performed in accordance with the process that is depicted in FIG. 7. The process that is depicted in FIG. 7 begins at step/operation 701 when the predictive data analysis system 101 processes the input data object using a rule-based processing framework to update input data object. For example, the predictive data analysis system 101 may process the input data object using a rule-based processing framework characterized by a set of business rules to update the input data object. While various embodiments of the present invention describing updating the input data object using a rule-based processing framework prior to processing the input data object using the pipelined machine learning models, a person of ordinary skill in the relevant technology will recognize that such updating may be skipped and the input data object provided by the output aggregation system 103 and/or provided by a client computing entity 102 may be directly processed by the pipelined machine learning frameworks to generate the augmented input data objects.

At step/operation 702, the predictive data analysis system 101 processes the refined input data object using the pipelined machine learning models to generate an augmented input data object corresponding to the input data object. The pipelined machine learning models may include a set of machine learning models that include an error correction machine learning model that is configured to process an input data object to generate an error-corrected input data object as well as an output augmentation machine learning model, where the input to the output augmentation machine learning model is determined based at least in part on the error-corrected input data object. For example, the pipelined machine learning models may include the following arrangement of two machine learning models: an error correction machine learning model that is configured to process an input data object to generate an error-corrected input data object followed by an output augmentation machine learning model that is configured to process the error-corrected input data object to generate the augmented input data object. As another example, the pipelined machine learning models may include the following arrangement of three or more machine learning models: an error correction machine learning model that is configured to process an input data object to generate an error-corrected input data object, followed by one or more other machine learning models that are collectively configured to process the error-corrected input data object to generate a refined input data object, and followed by an output augmentation machine learning model that is configured to process the refined input data object to generate the augmented input data object.

The error correction machine learning model may be a machine learning model that is configured to process an input data object in order to generate an error-corrected input data object. For example, the error correction machine learning model may be configured to process an input data object having n selected input data fields to determine, for each of n selected input data fields, a per-field error likelihood value that describes the likelihood that the value of the input data field has been erroneously recorded to be lower than the actual value for the input data field, and then generate the error-corrected input data object based at least in part on each per-field error likelihood value. As another example, the error correction machine learning model may be configured to process an input data object having n selected input data fields to determine, for each of the n selected input data fields, a per-field error likelihood value that describes the likelihood that the value of the input data field has been erroneously recorded to be higher than the actual value for the input data field, and then generate the error-corrected input data object based at least in part on each per-field error likelihood value. As yet another example, the error correction machine learning model may be configured to process an input data object having n selected input data fields to determine, for each of the n selected input data fields, a per-field error likelihood value that describes the likelihood that the value of the input data field has been erroneously recorded to be different from the actual value for the input data field, and then generate the error-corrected input data object based at least in part on each per-field error likelihood value. As a further example, the error correction machine learning model may be configured to process an input data object having n selected input data fields to determine, for each of the n selected input data fields, a per-field error likelihood value that describes the likelihood that the value of the input data field has been erroneously recorded to be substantially different from the actual value for the input data field, where the difference between a recorded value for an input data field and an actual value for the input data field may be deemed substantial if the noted difference exceeds a difference threshold, and then generate the error-corrected input data object based at least in part on each per-field error likelihood value. Exemplary techniques for training an error correction machine learning model and/or for utilized a trained error correction machine learning model to generate error-corrected input data objects are described with reference to FIGS. 9-10.

An error-corrected input data object may be a data object having the same arrangement of input data fields as a corresponding input data object, where the input data fields of the input data fields of the error-corrected input data object have been corrected in accordance with each per-field error likelihood value associated with the input data object as determined via processing the input data object using an error correction machine learning model. For example, if an input data object includes the input data fields F1, F2, and F3, and if the per-field error likelihood value for the input data field F1 describes sufficient likelihood that the input data field likely has an actual value that is higher than the recorded value for the input data field F2, the per-field error likelihood value for the input data field F1 describes insufficient likelihood that the input data field likely has an actual value that is higher than the recorded value for the input data field F2, and the per-field error likelihood value for the input data field F3 describes insufficient likelihood that the input data field likely has an actual value that is higher than the recorded value for the input data field F3, then the error-corrected input data object may include an upward-adjusted value for the input data field F1, the recorded data value for the input data field F2, and the recorded data value for the input data field F3.

The output augmentation machine learning model may be a machine learning model that is configured to process a fine-tuned input data object (e.g., an error-corrected input data object and/or a refined input data object that is determined based at least in part on the error-corrected input data object) to generate an augmented input data object. For example, the output augmentation machine learning model may be configured to: (i) process the fine-tuned input data object to generate a secondary output necessity prediction that describes whether a primary predictive output described by an output data object corresponding to the fine-tuned input data object will likely fail to achieve a desired outcome, (ii) for each of a group of potential adjustments to the primary predictive output (e.g., for each available insurance discount, for each available insurance coverage adjustment, and/or the like), generate a per-adjustment outcome propensity prediction describing whether the potential adjustment will increase the likelihood of the achievement of the desired outcome, and (iii) generate the augmented input data object based at least in part on the fine-tuned input data object, the secondary output necessity prediction, and each per-adjustment outcome propensity prediction. Exemplary techniques for training an output augmentation machine learning model and/or for utilized a trained output augmentation machine learning model to generate augmented input data objects are described with reference to FIGS. 11-12.

An augmented input data object may describe the input data fields of a fine-tuned input data object associated with an input data object as well as at least one of the following: (i) generate a secondary output necessity prediction that describes whether a primary predictive output described by an output data object corresponding to the fine-tuned input data object will likely fail to achieve a desired outcome, and (ii) for each of a group of potential adjustments to the primary predictive output, a per-adjustment outcome propensity prediction describing whether the potential adjustment will increase the likelihood of the achievement of the desired outcome. For example, the augmented input data object may describe one of the following: (i) a positive secondary output necessity prediction describing that a primary predictive output described by an output data object corresponding to the fine-tuned input data object will likely fail to achieve a desired outcome along with, for each of a group of potential adjustments to the primary predictive output, a per-adjustment outcome propensity prediction describing whether the potential adjustment will increase the likelihood of the achievement of the desired outcome; or (ii) a negative secondary output necessity prediction describing that a primary predictive output described by an output data object corresponding to the fine-tuned input data object will not likely fail to achieve a desired outcome.

At step/operation 703, the predictive data analysis system 101 generates the output data object based at least in part on the augmented input data object. In some embodiments, if the augmented data object describes a positive secondary output necessity prediction describing that a primary predictive output described by an output data object corresponding to the fine-tuned input data object will likely fail to achieve a desired outcome, the output data object may include a primary predictive output as well as a second predictive output determined based at least in part on each potential adjustment having a positive per-adjustment outcome propensity prediction describing that the potential adjustment will increase the likelihood of the achievement of the desired outcome. In some embodiments, if the augmented data object describes a negative secondary output necessity prediction describing that a primary predictive output described by an output data object corresponding to the fine-tuned input data object will not likely fail to achieve a desired outcome, the output data object may only include a primary predictive output.

Returning to FIG. 5, at step/operation 503, the predictive data analysis system 101 provides the output data object to the client computing entity 102 associated with the end-user-initiated query associated with the input data object. In some embodiments, the predictive data analysis system 101 provides the output data object to output aggregation system 103, which then provides the output data object to the client computing entity 102. In some embodiments, the predictive data analysis system 101 directly provides the output data object to the client computing entity 102 associated with the end-user-initiated query associated with the input data object.

In some embodiments, aspects of step/operation 503 may be performed in accordance with the process that is depicted in FIG. 8. As depicted in FIG. 8, the predictive data analysis system 101 provides the output data object (e.g., an XML data object) to the output aggregation system 103 at step/operation 801. At step/operation 802, the output aggregation system 103 generates a ranked list of output data objects received from output generation server systems. At step/operation 803, the output aggregation system 103 provides display data associated with the ranked list to the client computing entity 102.

B. Error Correction Machine Learning Models

Various embodiments of the present invention address technical challenges related to improving efficiency and effectiveness of performing error correction using machine learning models. Various existing error correction machine learning models have substantial efficiency challenges because they need to infer complex patterns across input data objects and compare those complex patterns to inferences about non-anomalous data patterns. These complexities cause various existing error correction machine learning models to require a greater number of training epochs to train. Once trained, the noted error correction machine learning models have accuracy/reliability drawbacks. Various embodiments of the present invention address the noted challenges associated with efficiency and effectiveness of performing error correction using machine learning models by using error correction machine learning models that process one or more inference error correction engineered features including an agent-based error likelihood value describing an estimated error likelihood of an input provider agent associated with the input data object. Using agent-based error likelihood value describing an estimated error likelihood of an input provider agent associated with the input data object provides significant predictive insights that enable error correction machine learning models disclosed by various embodiments of the present invention to be trained using a fewer number of training epochs, which in turn increases the computational efficiency of performing error correction using those error correction machine learning models as well as the accuracy/reliability performing error correction using those error correction machine learning models.

FIG. 9 is a flowchart diagram of an example process 900 for training an error correction machine learning model. Via the various steps/operations of the process 900, the predictive data analysis system 101 can efficiently and effectively utilize multiple machine learning frameworks in a coordinated manner to perform input data correction and output augmentation as part of generating an output data object corresponding to the input data object. While various embodiments of the present invention describe performing operations of an error correction machine learning model prior to operations of an output augmentation machine learning model, a person of ordinary skill in the relevant technology will recognize that the two noted machine learning models may be trained/used/deployed in a manner that is exclusive of and/or independent of each other.

The process 900 begins at step/operation 901 when the predictive data analysis system 101 identifies training error correction data objects. An training error correction data object may describe an input data object having m input data fields and, for each input data field of a subset of (e.g., n of) the m input data fields, a ground-truth per-field error descriptor that describes the likelihood that the value of the input data field has been erroneously recorded to have a particle magnitude-based relationship with the actual value for the input data field. For example, an training error correction data object may describe an input data object having m input data fields and, for each input data field of a subset of (e.g., n of) the m input data fields, a per-field error likelihood value that describes the likelihood that the value of the input data field has been erroneously recorded to be lower than the actual value for the input data field. As another example, an training error correction data object may describe an input data object having m input data fields and, for each input data field of a subset of (e.g., n of) the m input data fields, a per-field error likelihood value that describes the likelihood that the value of the input data field has been erroneously recorded to be higher than the actual value for the input data field. As yet another example, an training error correction data object may describe an input data object having m input data fields and, for each input data field of a subset of (e.g., n of) the m input data fields, a per-field error likelihood value that describes the likelihood that the value of the input data field has been erroneously recorded to be different from the actual value for the input data field. As a further example, an training error correction data object may describe an input data object having m input data fields and, for each input data field of a subset of (e.g., n of) the m input data fields, a per-field error likelihood value that describes the likelihood that the value of the input data field has been erroneously recorded to be different from the actual value for the input data field, where the difference between a recorded value for an input data field and an actual value for the input data field may be deemed substantial if the noted difference exceeds a difference threshold. In some embodiments, the ground-truth per-field error descriptors described by the training data objects are determined based at least in part on historical data about whether recorded values provided by input data objects were subsequently corrected after ground-truth data about those recorded values were retrieved. For example, the ground-truth per-field error descriptor for an input data field corresponding to a prior tenure field of an input data object may be determined based at least in part on whether the prior tenure field value provided by the input data object was revised by a subsequently-retrieved insurance history report associated with the input data object.

At step/operation 902, the predictive data analysis system 101 generates one or more error correction training engineered features for each training error correction data object based at least in part on the training error correction data object. A training error correction engineered feature may describe a feature that is configured to be encoded to generate an input to an error correction machine learning model either during training of the error correction machine learning model. Examples of training error correction engineered features for an training error correction data object include: (i) for each selected input data field of n selected input data fields of the training error correction data object, a per-field-type error likelihood value that describes an estimated likelihood the selected input data field is erroneous given the input data field type of the selected input data field (e.g., for a selected input data field that is associated with a prior tenure input data field type, a per-field-type error likelihood value that is determined based at least in part on the ratio of observed erroneous recordation of values for the prior tenure input data field type), and (ii) an agent-based error likelihood value that describes an estimated likelihood that the input provider agent (e.g., the insurance agent) associated with the training error correction data object provides erroneous information (e.g., an agent-based error likelihood value determined based at least in part on the ratio of erroneous data entries by the input provider agent that is associated with the training error correction data object).

At step/operation 903, the predictive data analysis system 101 performs mean target encoding with smoothing on each set of one or more training error correction engineered features for a training error correction data object based at least in part on the training error correction data object to generate a finalized training error correction data object. In some embodiments, performing mean target encoding with smoothing to generate a particular finalized training input data field of the finalized training error correction data object that has a particular finalized training input data field type is performed using the equation $$\mu = \frac{n * \bar{x} + m * w}{n + m},$$

where μ is the particular finalized training input data field, n is the number of finalized training input data fields across all sets of one or more training error correction engineered features for the particular finalized training input data field type, x̄ is the estimated mean of all finalized training input data fields across all sets of one or one or more training error correction engineered features for the particular finalized training input data field type, m is a smoothing weight assigned to the overall mean of finalized training input data fields across all sets of one or one or more training error correction engineered features for the particular finalized training input data field type, and w is the overall mean of finalized training input data fields across all sets of one or one or more training error correction engineered features for the particular finalized training input data field type.

At step/operation 904, the predictive data analysis system 101 performs cross-validation with grid search on the finalized training error correction data objects to generate the error correction machine learning model (e.g., a gradient boosting machine) and validate the error correction machine learning model. In some embodiments, the predictive data analysis system 101 determines whether the validation score describes that the error correction machine learning model is sufficiently predictive, and, if so, provides the error correction machine learning model for use in performing predictive inferences in order to generate error-corrected input data objects for input data objects.

Once trained, the trained error correction machine learning model can be used by the predictive data analysis system 101 to generate an error-corrected input data object for an input data object. FIG. 10 is a flowchart diagram of an example process for processing an input data object using a trained error correction machine learning model. Via the various steps/operations of the process 1000, the predictive data analysis system 101 can efficiently and effectively utilize multiple machine learning frameworks in a coordinated manner to perform input data correction and output augmentation as part of generating an output data object corresponding to the input data object. While various embodiments of the present invention describe performing operations of an error correction machine learning model prior to operations of an output augmentation machine learning model, a person of ordinary skill in the relevant technology will recognize that the two noted machine learning models may be trained/used/deployed in a manner that is exclusive of and/or independent of each other.

The process 1000 begins at step/operation 1001 when the predictive data analysis system 101 identifies an input data object. In some embodiments, the predictive data analysis system 101 receives the input data object from an output aggregation system 103. In some embodiments, the output aggregation system 103 generates the input data object based at least in part on end-user-initiated query data provided by a client computing entity 102. While various embodiments of the present invention describe that the predictive data analysis system 101 receives input data objects from an output aggregation system 103, a person of ordinary skill in the relevant technology will recognize that the predictive data analysis system 101 may receive the input data objects directly from the client computing entities 102.

An input data object may describe one or more input data fields associated with an end-user-initiate query, where the one or more input data fields may be defined by an applicable schema of an expected/desired input of a predictive data analysis system to which the input data object is provided. As described above, an output aggregation system may be configured to provide input data objects to two or more output generation server systems (e.g., to two or more output generation server systems that are associated with two or more insurance providers). In some of the embodiments in which an output aggregation system provides input data objects to two or more output generation server systems, the output aggregation system may provide the same input data object for a particular end-user-initiated query to the output generation systems. This may for example be the case if the two or more output generation systems utilize a common schema for expected/desired inputs (e.g., according to an industry standard). In some of the embodiments in which an output aggregation system provides input data objects to two or more output generation server systems, the output aggregation system may provide a different input data object to each defined subset of the output generation server systems. For example, given output generation server systems O1, O2, and O3, the output aggregation system may be configured to provide an input data object I1 to output generation server systems O1-O2 and a separate input data object I2 to the output generation server system O3. As described above, an end-user-initiated query may be a request for an insurance rate. In some of the embodiments in which an end-user-initiated query is a request for an insurance rate, the input data object may describe properties of an existing insurance carrier associated with the noted request for insurance rate, including input data fields describing prior insurance tenure of the existing insurance carrier, the prior bodily injury (BI) limits of the existing insurance carrier, prior liabilities incurred by the existing insurance carrier, the foundation type of the existing insurance carrier, and/or the like.

At step/operation 1002, the predictive data analysis system 101 generates one or more one or more inference error correction engineered features for the input data object based at least in part on the input data object. An inference error correction engineered feature may describe a feature that is configured to be encoded to generate an input to an error correction machine learning model during a predictive inference performed by the error correction machine learning model subsequent to training of the error correction machine learning. Examples of inference error correction engineered features for input data object include: (i) for each selected input data field of n selected input data fields of the input data object, a per-field-type error likelihood value that describes the likelihood that selected input data field is erroneous given the input data field type of the selected input data field (e.g., for a selected input data field that is associated with a prior tenure input data field type, a per-field-type error likelihood value that is determined based at least in part on the ratio of observed erroneous recordation of values for the prior tenure input data field type), and (ii) an agent-based error likelihood value that describes a likelihood that the input provider agent (e.g., the insurance agent) associated with the input data object provides erroneous information (e.g., an agent-based error likelihood value determined based at least in part on the ratio of erroneous data entries by the input provider agent that is associated with the training error correction data object).

At step/operation 1003, the predictive data analysis system 101 performs mean target encoding with smoothing on the set of one or more inference error correction engineered features for the input data object to generate a finalized input data object. In some embodiments, performing mean target encoding with smoothing to generate a particular finalized input data field of the finalized input data object that has a particular finalized input data field type is performed using the equation $$\mu = \frac{n * \overline{x} + m * w}{n + m},$$

where μ is the particular finalized input data field, n is the number of finalized input data fields across all sets of one or more inference error correction engineered features for the particular finalized input data field type, x is the estimated mean of all finalized input data fields across all sets of one or one or more inference error correction engineered features for the particular finalized input data field type, m is a smoothing weight assigned to the overall mean of finalized input data fields across all sets of one or one or more inference error correction engineered features for the particular finalized input data field type, and w is the overall mean of finalized input data fields across all sets of one or one or more inference error correction engineered features for the particular finalized input data field type.

At step/operation 1104, the predictive data analysis system 101 processes the finalized input data object using the error correction machine learning model to generate an error-corrected input data object. An error-corrected input data object may be a data object having the same arrangement of input data fields as a corresponding input data object, where the input data fields of the input data fields of the error-corrected input data object have been corrected in accordance with each per-field error likelihood prediction associated with the input data object as determined via processing the input data object using an error correction machine learning model. For example, if an input data object includes the input data fields F1, F2, and F3, and if the per-field error likelihood value for the input data field F1 describes sufficient likelihood that the input data field likely has an actual value that is higher than the recorded value for the input data field F2, the per-field error likelihood value for the input data field F1 describes insufficient likelihood that the input data field likely has an actual value that is higher than the recorded value for the input data field F2, and the per-field error likelihood value for the input data field F3 describes insufficient likelihood that the input data field likely has an actual value that is higher than the recorded value for the input data field F3, then the error-corrected input data object may include an upward-adjusted value for the input data field F1, the recorded data value for the input data field F2, and the recorded data value for the input data field F3.

The error correction machine learning model may be configured to process an input data object in order to generate an error-corrected input data object. For example, the error correction machine learning model may be configured to process an input data object having n data fields to determine, for each of the n input data fields, a per-field error likelihood prediction that describes the likelihood that the value of the input data field has been erroneously recorded to be lower than the actual value for the input data field, and then generate the error-corrected input data object based at least in part on each per-field error likelihood prediction. As another example, the error correction machine learning model may be configured to process an input data object having n data fields to determine, for each of the n input data fields, a per-field error likelihood prediction that describes the likelihood that the value of the input data field has been erroneously recorded to be higher than the actual value for the input data field, and then generate the error-corrected input data object based at least in part on each per-field error likelihood prediction. As yet another example, the error correction machine learning model may be configured to process an input data object having n data fields to determine, for each of the n input data fields, a per-field error likelihood prediction that describes the likelihood that the value of the input data field has been erroneously recorded to be different from the actual value for the input data field, and then generate the error-corrected input data object based at least in part on each per-field error likelihood prediction. As a further example, the error correction machine learning model may be configured to process an input data object having n data fields to determine, for each of the n input data fields, a per-field error likelihood prediction that describes the likelihood that the value of the input data field has been erroneously recorded to be substantially different from the actual value for the input data field, where the difference between a recorded value for an input data field and an actual value for the input data field may be deemed substantial if the noted difference exceeds a difference threshold, and then generate the error-corrected input data object based at least in part on each per-field error likelihood prediction.

C. Output Augmentation Machine Learning Models

Various embodiments of the present invention address technical challenges related to improving efficiency and effectiveness of performing output augmentation using machine learning models. Various existing output augmentation machine learning models have substantial efficiency challenges because they need to infer complex patterns associated with whether output data objects need to be augmented to achieve desired outcomes, such as to be selected by target end users. These complexities cause various existing output augmentation machine learning models to require a greater number of training epochs to train and to be less reliable after those output augmentation machine learning models are trained. Various embodiments of the present invention address the noted challenges associated with efficiency and effectiveness of performing output augmentation using machine learning models by using error correction machine learning models that process one or more inference output augmentation engineered features including an agent-based selection likelihood value describing an estimated likelihood of achievement of a desired outcome if a secondary predictive output is provided along with a primary predictive output as part of the predictive output data object. Using an agent-based selection likelihood values provides significant predictive insights that enable output augmentation machine learning models disclosed by various embodiments of the present invention to be trained using a fewer number of training epochs, which in turn increases the computational efficiency of performing output augmentation using those error correction machine learning models as well as the accuracy/reliability performing output augmentation operations using those error correction machine learning models.

FIG. 11 is a flowchart diagram of an example process 1100 for training an output augmentation machine learning model. Via the various steps/operations of the process 1100, the predictive data analysis system 101 can efficiently and effectively utilize multiple machine learning frameworks in a coordinated manner to perform input data correction and output augmentation as part of generating an output data object corresponding to the input data object. While various embodiments of the present invention describe performing operations of an error correction machine learning model prior to operations of an output augmentation machine learning model, a person of ordinary skill in the relevant technology will recognize that the two noted machine learning models may be trained/used/deployed in a manner that is exclusive of and/or independent of each other.

The process 1100 begins at step/operation 1101 when the predictive data analysis system 101 identifies one or more output augmentation training data objects. An output augmentation training data object may describe a fine-tuned input data object along with an observed ratio of occurrences of instances in which inclusion of a secondary predictive output along with a primary prediction corresponding to the fine-tuned data object (e.g., inclusion of a secondary insurance rate along with a primary insurance rate corresponding to the fine-tuned data object) has achieved a desired outcome (e.g., clicking/selecting of the secondary insurance rate by an insurance agent). In some embodiments, the output augmentation training data objects are generated by providing secondary predictive outputs as part of output data objects for randomly-selected input data objects to end users and observing end-user reaction toward the secondary predictive outputs.

At step/operation 1102, the predictive data analysis system 101 generates one or more training output augmentation engineered features for each output augmentation training data object based at least in part on the output augmentation training data object. A training output augmentation engineered feature may describe a feature that is configured to be provided as an input to an output augmentation machine learning model during training of the output augmentation machine learning model. Examples of training output augmentation engineered features for an output augmentation training data object include an agent-based selection likelihood value that describes a likelihood that the input provider agent (e.g., the insurance agent) associated with the output augmentation training data object clicks/selects a secondary predictive output associated with the output augmentation training data object (e.g., an agent-based selection likelihood value determined based at least in part on the past clicking/selection behavior of the input provider agent associated with the output augmentation training data object).

At step/operation 1103, the predictive data analysis system 101 performs mean target encoding with smoothing on each set of one or more training output augmentation engineered features for a training output augmentation data object based at least in part on the training output augmentation data object to generate a finalized training output augmentation data object. In some embodiments, performing mean target encoding with smoothing to generate a particular finalized training input data field of the finalized training output augmentation data object that has a particular finalized training input data field type is performed using the equation $$\mu = \frac{n * \bar{x} + m * w}{n + m},$$

where μ is the particular finalized training input data field, n is the number of finalized training input data fields across all sets of one or more training output augmentation engineered features for the particular finalized training input data field type, $\bar{x}$ is the estimated mean of all finalized training input data fields across all sets of one or one or more training output augmentation engineered features for the particular finalized training input data field type, m is a smoothing weight assigned to the overall mean of finalized training input data fields across all sets of one or one or more training output augmentation engineered features for the particular finalized training input data field type, and w is the overall mean of finalized training input data fields across all sets of one or one or more training output augmentation engineered features for the particular finalized training input data field type.

At step/operation 1104, the predictive data analysis system 101 performs cross-validation with grid search on the finalized output augmentation training data objects to generate the output augmentation machine learning model (e.g., a gradient boosting machine) and validate the output augmentation machine learning model. In some embodiments, the predictive data analysis system 101 determines whether the validation score describes that the output augmentation machine learning model is sufficiently predictive, and, if so, provides the output augmentation machine learning model for use in performing predictive inferences in order to generate augmented input data objects for fine-tuned input data objects.

Once trained, the trained output augmentation machine learning model can be used by the predictive data analysis system 101 to generate an augmented input data object for a fine-tuned input data object. FIG. 12 is a flowchart diagram of an example process for processing an input data object using a trained output augmentation machine learning model. Via the various steps/operations of the process 1200, the predictive data analysis system 101 can efficiently and effectively utilize multiple machine learning frameworks in a coordinated manner to perform input data correction and output augmentation as part of generating an output data object corresponding to the input data object. While various embodiments of the present invention describe performing operations of an error correction machine learning model prior to operations of an output augmentation machine learning model, a person of ordinary skill in the relevant technology will recognize that the two noted machine learning models may be trained/used/deployed in a manner that is exclusive of and/or independent of each other.

The process 1200 begins at step/operation 1201 when the predictive data analysis system 101 identifies a fine-tuned input data object (e.g., an error-corrected input data object and/or a refined input data object that is determined based at least in part on the error-corrected input data object). Whether a fine-tuned input data object is generated by an error correction machine learning model may in some embodiments depend on the arrangement of pipelined machine learning models used to generate fine-tuned input data objects. In general, pipelined machine learning models may include a set of machine learning models that include an error correction machine learning model that is configured to process an input data object to generate an error-corrected input data object as well as an output augmentation machine learning model, where the input to the output augmentation machine learning model is a fine-tuned input data object that is determined based at least in part on the error-corrected input data object. For example, the pipelined machine learning models may include the following arrangement of two machine learning models: an error correction machine learning model that is configured to process an input data object to generate an error-corrected input data object followed by an output augmentation machine learning model that is configured to process the error-corrected input data object to generate the augmented input data object. As another example, the pipelined machine learning models may include the following arrangement of three or more machine learning models: an error correction machine learning model that is configured to process an input data object to generate an error-corrected input data object, followed by one or more other machine learning models that are collectively configured to process the error-corrected input data object to generate a refined input data object, and followed by an output augmentation machine learning model that is configured to process the refined input data object to generate the augmented input data object.

At step/operation 1202, the predictive data analysis system 101 generates one or more output augmentation input engineered features for the fine-tuned input data object based at least in part on the fine-tuned input training data object. An inference output augmentation engineered feature may describe a feature that is configured to be provided as an input to an output augmentation machine learning model during an inference performed using a trained output augmentation machine learning model. Examples of inference output augmentation engineered features for an output augmentation training data object include an agent-based selection likelihood value that describes a likelihood that the input provider agent (e.g., the insurance agent) associated with the fine-tuned input data object clicks/selects a secondary predictive output associated with the output augmentation training data object (e.g., an agent-based selection likelihood value determined based at least in part on the past clicking/selection behavior of the input provider agent associated with the output augmentation training data object).

At step/operation 1203, the predictive data analysis system 101 performs mean target encoding with smoothing on the set of one or more inference output augmentation engineered features for the input data object to generate a finalized input data object. In some embodiments, performing mean target encoding with smoothing to generate a particular finalized input data field of the finalized input data object that has a particular finalized input data field type is performed using the equation $$\mu = \frac{n * \bar{x} + m * w}{n + m},$$

where μ is the particular finalized input data field, n is the number of finalized input data fields across all sets of one or more inference output augmentation engineered features for the particular finalized input data field type, x̄ is the estimated mean of all finalized input data fields across all sets of one or one or more inference output augmentation engineered features for the particular finalized input data field type, m is a smoothing weight assigned to the overall mean of finalized input data fields across all sets of one or one or more inference output augmentation engineered features for the particular finalized input data field type, and w is the overall mean of finalized input data fields across all sets of one or one or more inference output augmentation engineered features for the particular finalized input data field type.

At step/operation 1204, the predictive data analysis system 101 generates an augmented input data object based at least in part on the one or more output augmentation input engineered features. An augmented input data object may describe the input data fields of a fine-tuned input data object associated with an input data object as well as at least one of the following: (i) a secondary output necessity prediction that describes whether a primary predictive output described by an output data object corresponding to the fine-tuned input data object will likely fail to achieve a desired outcome, and (ii) for each of a group of potential adjustments to the primary predictive output, a per-adjustment outcome propensity prediction describing whether the potential adjustment will increase the likelihood of the achievement of the desired outcome. For example, the augmented input data object may describe one of the following: (i) a positive secondary output necessity prediction describing that a primary predictive output described by an output data object corresponding to the fine-tuned input data object will likely fail to achieve a desired outcome along with, for each of a group of potential adjustments to the primary predictive output, a per-adjustment outcome propensity prediction describing whether the potential adjustment will increase the likelihood of the achievement of the desired outcome; or (ii) a negative secondary output necessity prediction describing that a primary predictive output described by an output data object corresponding to the fine-tuned input data object will not likely fail to achieve a desired outcome.

The output augmentation machine learning model may be configured to process a fine-tuned input data object (e.g., an error-corrected input data object and/or a refined input data object that is determined based at least in part on the error-corrected input data object) to generate an augmented input data object. For example, the output augmentation machine learning model may be configured to: (i) process the fine-tuned input data object to generate a secondary output necessity prediction that describes whether a primary predictive output described by an output data object corresponding to the fine-tuned input data object will likely fail to achieve a desired outcome, (ii) for each of a group of potential adjustments to the primary predictive output (e.g., for each available insurance discount, for each available insurance coverage adjustment, and/or the like), generate a per-adjustment outcome propensity prediction describing whether the potential adjustment will increase the likelihood of the achievement of the desired outcome, and (iii) generate the augmented input data object based at least in part on the fine-tuned input data object, the secondary output necessity prediction, and each per-adjustment outcome propensity prediction.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for generating a predictive output based at least in part on an input data object, the computer-implemented method comprising:
   generating, by one or more processors, one or more inference error correction engineered features based at least in part on the input data object, wherein the one or more inference error correction engineered features include an agent-based error likelihood value describing an estimated error likelihood of an input provider agent associated with the input data object;
   processing, by the one or more processors, the one or more inference error correction engineered features, using a trained error correction machine learning model of a pipelined machine learning framework, to generate an error-corrected input data object in which one or more input data fields corresponding to the input data object are adjusted based at least in part on the one or more inference error correction engineered features; and
   generating, by the one or more processors, the predictive output based at least in part on the error-corrected input data object.

2. The computer-implemented method of claim 1, wherein the one or more inference error correction engineered features comprise a per-field-type error likelihood value for each selected input data field of one or more selected input fields of the input data object that describes an estimated error likelihood of an input data field type associated with the selected input data field.

3. The computer-implemented method of claim 1, wherein generating the trained error correction machine learning model comprises:
   identifying one or more training error correction data objects;
   for each training error correction data object of the one or more training error correction data objects:
      determining a set of training error correction engineered features, and
      determining a finalized training error correction data object based at least in part on the set of training error correction engineered features; and
   generating the trained error correction machine learning model based at least in part on each finalized training error correction data object for a training error correction data object of the one or more training error correction data objects.

4. The computer-implemented method of claim 3, wherein each training error correction data object of the one or more training error correction data objects may describe a per-field error likelihood value for each selected input data field of one or more selected input fields of the input data object.

5. The computer-implemented method of claim 3, wherein generating the trained error correction machine learning model based at least in part on each finalized training error correction data object for the training error correction data object comprises performing cross-validation with grid search using each finalized training error correction data object for the training error correction data object to generate the trained error correction machine learning model.

6. The computer-implemented method of claim 3, wherein determining the finalized training error correction data object comprises performing mean target feature encoding with smoothing on the training error correction data object to determine the finalized training error correction data object.

7. The computer-implemented method of claim 1, wherein the trained error correction machine learning model comprises a trained gradient boosting machine learning model.

8. A system for generating a predictive output based at least in part on an input data object, the system comprising one or more processors and memory including program code, the memory and the program code configured to, with the one or more processors, cause the system to at least:
  generate one or more inference error correction engineered features based at least in part on the input data object, wherein the one or more inference error correction engineered features include an agent-based error likelihood value describing an estimated error likelihood of an input provider agent associated with the input data object;
  process the one or more inference error correction engineered features using a trained error correction machine learning model of a pipelined machine learning framework to generate an error-corrected input data object in which one or more input data fields corresponding to the input data object are adjusted based at least in part on the one or more inference error correction engineered features; and
  generate the predictive output based at least in part on the error-corrected input data object.

9. The system of claim 8, wherein the one or more inference error correction engineered features comprise a per-field-type error likelihood value for each selected input data field of one or more selected input fields of the input data object that describes an estimated error likelihood of an input data field type associated with the selected input data field.

10. The system of claim 8, wherein generating the trained error correction machine learning model comprises:
  identifying one or more training error correction data objects;
  for each training error correction data object of the one or more training error correction data objects:
    determining a set of training error correction engineered features, and
    determining a finalized training error correction data object based at least in part on the set of training error correction engineered features; and
  generating the trained error correction machine learning model based at least in part on each finalized training error correction data object for a training error correction data object of the one or more training error correction data objects.

11. The system of claim 10, wherein each training error correction data object of the one or more training error correction data objects may describe a per-field error likelihood value for each selected input data field of one or more selected input fields of the input data object.

12. The system of claim 10, wherein generating the trained error correction machine learning model based at least in part on each finalized training error correction data object for the training error correction data object comprises performing cross-validation with grid search using each finalized training error correction data object for the training error correction data object to generate the trained error correction machine learning model.

13. The system of claim 10, wherein determining the finalized training error correction data object comprises performing mean target feature encoding with smoothing on the training error correction data object to determine the finalized training error correction data object.

14. The system of claim 8, wherein the trained error correction machine learning model comprises a trained gradient boosting machine learning model.

15. A computer program product for generating a predictive output based at least in part on an input data object, the computer program product comprising at least one non-transitory computer-readable storage medium having computer-readable program code portions stored therein, the computer-readable program code portions configured to:
  generate one or more inference error correction engineered features based at least in part on the input data object, wherein the one or more inference error correction engineered features include an agent-based error likelihood value describing an estimated error likelihood of an input provider agent associated with the input data object;
  process the one or more inference error correction engineered features using a trained error correction machine learning model of a pipelined machine learning framework to generate an error-corrected input data object in which one or more input data fields corresponding to the input data object are adjusted based at least in part on the one or more inference error correction engineered features; and
  generate the predictive output based at least in part on the error-corrected input data object.

16. The computer program product of claim 15, wherein the one or more inference error correction engineered features comprise a per-field-type error likelihood value for each selected input data field of one or more selected input fields of the input data object that describes an estimated error likelihood of an input data field type associated with the selected input data field.

17. The computer program product of claim 15, wherein generating the trained error correction machine learning model comprises:
  identifying one or more training error correction data objects;
  for each training error correction data object of the one or more training error correction data objects:
    determining a set of training error correction engineered features, and
    determining a finalized training error correction data object based at least in part on the set of training error correction engineered features; and
  generating the trained error correction machine learning model based at least in part on each finalized training error correction data object for a training error correction data object of the one or more training error correction data objects.

18. The computer program product of claim 17, wherein each training error correction data object of the one or more training error correction data objects may describe a per-field error likelihood value for each selected input data field of one or more selected input fields of the input data object.

19. The computer program product of claim 17, wherein generating the trained error correction machine learning model based at least in part on each finalized training error correction data object for the training error correction data object comprises performing cross-validation with grid search using each finalized training error correction data object for the training error correction data object to generate the trained error correction machine learning model.

20. The computer program product of claim 17, wherein determining the finalized training error correction data object comprises performing mean target feature encoding with smoothing on the training error correction data object to determine the finalized training error correction data object.

* * * * *